United States Patent
Schweitzer, III et al.

(10) Patent No.: US 8,706,309 B2
(45) Date of Patent: Apr. 22, 2014

(54) SYSTEMS AND METHOD FOR OBTAINING A LOAD MODEL AND RELATED PARAMETERS BASED ON LOAD DYNAMICS

(75) Inventors: Edmund O. Schweitzer, III, Pullman, WA (US); Marcos A. Donolo, Pullman, WA (US); David E. Whitehead, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 465 days.

(21) Appl. No.: 12/757,995

(22) Filed: Apr. 10, 2010

(65) Prior Publication Data

US 2011/0251732 A1    Oct. 13, 2011

(51) Int. Cl.
*G06G 7/62* (2006.01)

(52) U.S. Cl.
USPC .............................. 700/291; 700/286; 703/18

(58) Field of Classification Search
USPC ......... 700/22, 28, 29, 31, 286, 291, 292, 293, 700/294, 295, 296, 297, 298; 703/13, 18
See application file for complete search history.

(56) References Cited

U.S. PATENT DOCUMENTS

| | | | |
|---|---|---|---|
| 4,387,336 A | 6/1983 | Joy | |
| 4,829,298 A | 5/1989 | Fernandes | |
| 5,006,846 A | 4/1991 | Granville | |
| 5,224,011 A | 6/1993 | Yalla | |
| 5,341,265 A | 8/1994 | Westrom | |
| 5,359,711 A | 10/1994 | Hartmann | |
| 5,446,682 A | 8/1995 | Janke | |
| 5,498,956 A | 3/1996 | Kinney | |
| 5,592,393 A | 1/1997 | Yalla | |
| 5,694,281 A | 12/1997 | Roberts | |
| 5,703,745 A | 12/1997 | Roberts | |
| 5,731,943 A | 3/1998 | Roberts | |
| 5,963,404 A | 10/1999 | Guzman-Casillas | |
| 6,028,754 A | 2/2000 | Guzman | |
| 6,061,609 A * | 5/2000 | Kanoi et al. | 700/291 |

(Continued)

FOREIGN PATENT DOCUMENTS

| | | |
|---|---|---|
| WO | 2008/020667 | 2/2008 |
| WO | 2005/076410 | 6/2009 |

OTHER PUBLICATIONS

PCT/US2011/029435 International Searching Authority International Search Report and Written Opinion of the International Searching Authority, Jun. 20, 2011.

(Continued)

*Primary Examiner* — Charles Kasenge
(74) *Attorney, Agent, or Firm* — Jared L. Cherry

(57) ABSTRACT

Disclosed are systems and methods for calculating load models and associated tunable parameters that may be used to describe the behavior of loads connected to an electric power distribution system. The load models may be utilized to predict variations in demand caused by changes in the supply voltage, and may be utilized in determining an optimized control strategy based on load dynamics. Any action which causes a disruption to the electric power distribution system may provide information regarding the composition or dynamics of connected loads. Such actions may be referred to as modeling events. Modeling events may occur with some frequency in electric power distribution systems, and accordingly, a number of data sets may be acquired under a variety of conditions and at a variety of times. Load models may include static load models, dynamic load models, or a combination of static and dynamic load models.

22 Claims, 18 Drawing Sheets

(56) References Cited

U.S. PATENT DOCUMENTS

| | | |
|---|---|---|
| 6,236,949 B1 | 5/2001 | Hart |
| 6,265,881 B1 | 7/2001 | Meliopoulos |
| 6,341,055 B1 | 1/2002 | Guzman |
| 6,356,421 B1 | 3/2002 | Guzman |
| 6,411,865 B1 | 6/2002 | Qin |
| 6,442,010 B1 | 8/2002 | Kasztenny |
| 6,446,682 B1 | 9/2002 | Viken |
| 6,549,880 B1 | 4/2003 | Willoughby |
| 6,603,298 B2 | 8/2003 | Guzman |
| 6,608,742 B2 | 8/2003 | Schweitzer |
| 6,662,124 B2 | 12/2003 | Schweitzer |
| 6,757,146 B2 | 6/2004 | Benmouyal |
| 6,839,210 B2 | 1/2005 | Roberts |
| 6,845,333 B2 | 1/2005 | Anderson |
| 6,946,753 B2 | 9/2005 | Kernahan |
| 7,069,117 B2 * | 6/2006 | Wilson et al. ............... 700/295 |
| 7,096,175 B2 | 8/2006 | Rehtanz |
| 7,196,884 B2 | 3/2007 | Guzman |
| 7,319,576 B2 | 1/2008 | Thompson |
| 7,369,950 B2 * | 5/2008 | Wall et al. .................... 702/60 |
| 7,415,725 B2 * | 8/2008 | Henneberry et al. ......... 700/295 |
| 7,480,580 B2 | 1/2009 | Zweigle |
| 7,570,469 B2 | 8/2009 | Guzman |
| 7,582,986 B2 | 9/2009 | Folkers |
| 7,584,066 B2 * | 9/2009 | Roytelman ................... 703/18 |
| 7,630,863 B2 | 12/2009 | Zweigle |
| 7,660,088 B2 | 2/2010 | Benmouyal |
| 7,693,607 B2 * | 4/2010 | Kasztenny et al. ........... 700/286 |
| 7,710,693 B2 | 5/2010 | Guzman |
| 7,729,810 B2 * | 6/2010 | Bell et al. ..................... 700/295 |
| 7,856,327 B2 | 12/2010 | Schweitzer |
| 7,979,222 B2 * | 7/2011 | Donde et al. ................. 702/61 |
| 8,000,910 B2 * | 8/2011 | Bickel .......................... 702/58 |
| 8,000,911 B2 * | 8/2011 | Carter et al. ................. 702/60 |
| 8,050,878 B2 | 11/2011 | Dougherty |
| 8,076,910 B2 * | 12/2011 | Bickel .......................... 323/205 |
| 2003/0187550 A1 * | 10/2003 | Wilson et al. ................ 700/295 |
| 2004/0027748 A1 | 2/2004 | Kojovic |
| 2004/0059469 A1 | 3/2004 | Hart |
| 2004/0243377 A1 * | 12/2004 | Roytelman ................... 703/18 |
| 2005/0125104 A1 * | 6/2005 | Wilson et al. ................ 700/295 |
| 2005/0143941 A1 * | 6/2005 | Forth et al. ................... 702/61 |
| 2006/0195229 A1 * | 8/2006 | Bell et al. ..................... 700/286 |
| 2006/0224336 A1 | 10/2006 | Petras |
| 2007/0055889 A1 * | 3/2007 | Henneberry et al. ......... 713/186 |
| 2007/0086134 A1 | 4/2007 | Zweigle |
| 2007/0297425 A1 * | 12/2007 | Chirco ......................... 370/401 |
| 2008/0065270 A1 * | 3/2008 | Kasztenny et al. ........... 700/286 |
| 2008/0071482 A1 * | 3/2008 | Zweigle et al. ............... 702/62 |
| 2008/0097694 A1 | 4/2008 | Petras |
| 2008/0103631 A1 * | 5/2008 | Koliwad et al. .............. 700/286 |
| 2008/0281540 A1 | 11/2008 | Zweigle |
| 2009/0085407 A1 | 4/2009 | Venkatasubramanian |
| 2009/0088989 A1 | 4/2009 | Guzman |
| 2009/0088990 A1 | 4/2009 | Schweitzer |
| 2009/0089608 A1 | 4/2009 | Guzman |
| 2009/0091867 A1 | 4/2009 | Guzman |
| 2009/0099798 A1 | 4/2009 | Gong |
| 2009/0254291 A1 * | 10/2009 | Benmouyal ................... 702/75 |
| 2009/0276170 A1 * | 11/2009 | Bickel .......................... 702/58 |
| 2009/0281679 A1 * | 11/2009 | Taft et al. ..................... 700/297 |
| 2009/0281742 A1 * | 11/2009 | Carter et al. ................. 702/60 |
| 2010/0002348 A1 | 1/2010 | Donolo |
| 2010/0013632 A1 * | 1/2010 | Salewske et al. ............. 340/540 |
| 2010/0037189 A1 * | 2/2010 | Bickel .......................... 716/4 |
| 2010/0114390 A1 | 5/2010 | Stevenson |
| 2010/0318238 A1 * | 12/2010 | Bryson et al. ................ 700/298 |

OTHER PUBLICATIONS

Power Systems Engineering Research Center, Enhanced State Estimation by Advanced Substation Monitoring Final Project Report, Nov. 2002.

IEEE Power Engineering Society, Cold Load Pickup Issues, May 16, 2008.

Y. Baghzouz, Craig Quist, Determination of Static Load Models from LTC and Capacitor Switching Tests, Jul. 16, 2000.

Electric Power Research Institute, Measurement-Based Load Modeling, Sep. 2006.

A.P. Sakis Meliopoulos, George J. Cokkinides, Floyd Galvan, Bruce Fardanesh, Distributed State Estimator—Advances and Demonstration, Jan. 7, 2008.

Saman A. Zonouz, William H. Sanders, A Kalman-based Coordination for Hierarchical State Estimation: Algorithm and Analysis, Jan. 7, 2008.

Terry L. Conrad, Concurrent Technologies Corporation, Distributed State Estimator at U.S. Virgin Islands Water and Power Authority St. Thomas and St. John, NASPI Working Group Meeting, Mar. 7, 2008.

ABB: Improved Power System Performance through Wide Area Monitoring, Protection, and Control, 2004.

ABB, Wide Area Measurement, Monitoring, Protection and Control Industrial IT for Energy System Operation—(2003).

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

M. Kezunovic, G. Latisko, Automated Monitoring Functions for Improved Power System Operation and Control, Power Engineering Society General Meeting, Jun. 12-16, 2005.

* cited by examiner

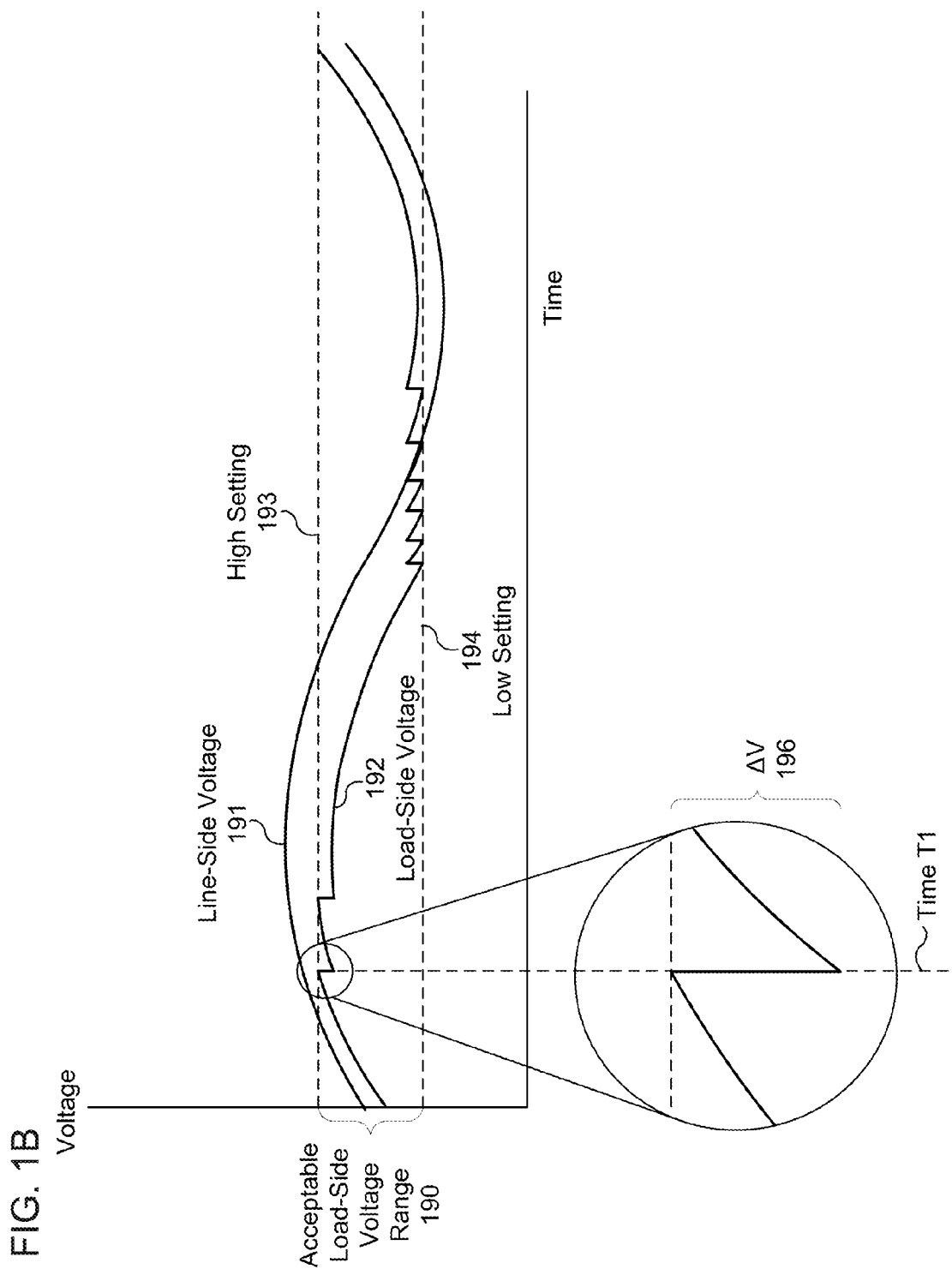

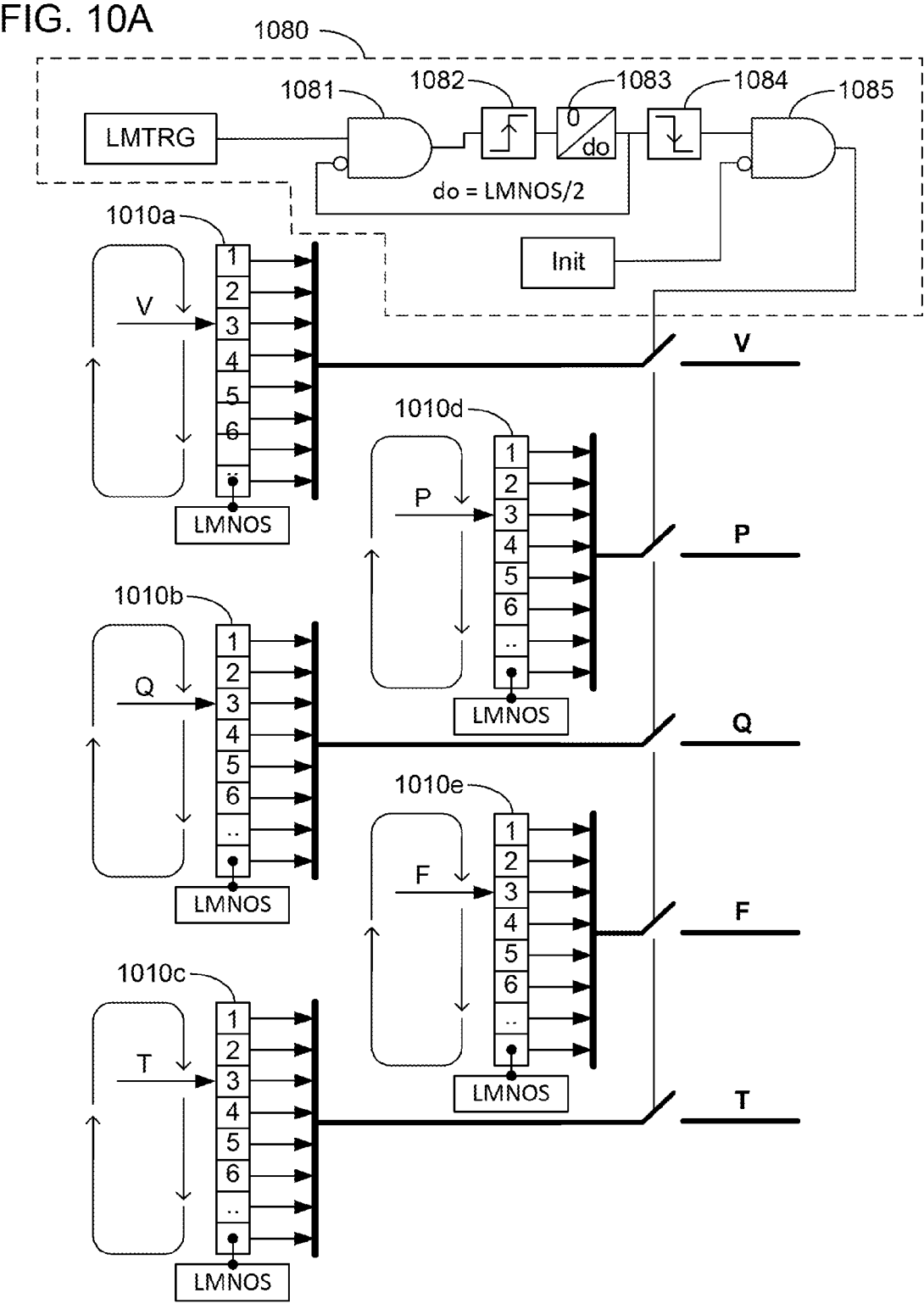

1101 Relay 2  Date: 04/07/2010  Time: 21:25:27.090
1102 Station 2  Serial Number: 2005087042

1103 EVENT NUMBER: zzzzz                           LMTIG TIME: xx:xx:xx.xxx
1104 Vmax: x.xxx

| | KZ | KI | KC | VA1 | VB1 | VA2 | VB2 | SNR |
|---|---|---|---|---|---|---|---|---|
1105 | | | | | 0.60 | 0.00 | 0.50 | 0.00 | xx.xxx |
1106 ACTIVE POWER MODEL: | 1.00 | 0.00 | 0.00 | | | | | |
1107 REACTIVE POWER MODEL: | 1.00 | 0.00 | 0.00 | 0.60 | 0.00 | 0.50 | 0.00 | xx.xxx |

1108 EVENT NUMBER: 10001                           LMTRIG DATE: 12/29/1999
1109 Vmin: x.xxx                                    LMTRG TIME: xx:xx:xx.xxx

| | KZ | KI | KC | VA1 | VB1 | VA2 | VB2 | SNR |
|---|---|---|---|---|---|---|---|---|
1110 | | | | | 0.60 | 0.00 | 0.50 | 0.00 | xx.xxx |
1111 ACTIVE POWER MODEL: | 1.00 | 0.00 | 0.00 | | | | | |
1112 REACTIVE POWER MODEL: | 1.00 | 0.00 | 0.00 | 0.60 | 0.00 | 0.50 | 0.00 | xx.xxx |

1113 EVENT NUMBER: 10000                           LMTRIG DATE: 12/29/1999
1114 Vmin: x.xxx                                    LMTRG TIME: xx:xx:xx.xxx

| | KZ | KI | KC | VA1 | VB1 | VA2 | VB2 | SNR |
|---|---|---|---|---|---|---|---|---|
1115 | | | | | 0.60 | 0.00 | 0.50 | 0.00 | xx.xxx |
1116 ACTIVE POWER MODEL: | 1.00 | 0.00 | 0.00 | | | | | |
1117 REACTIVE POWER MODEL: | 1.00 | 0.00 | 0.00 | 0.60 | 0.00 | 0.50 | 0.00 | xx.xxx |

1200

1201 Relay 2    Date: 04/07/2010  Time: 21:25:27.090
1202 Station 2  Serial Number: 2005087042

1203 <Corresponding LMHIS event data>

| # | LMTRG | V1 (pri.) (p.u.) | Frequency (HZ) | Act. Pow. (KW) | React. Pow. (KVAR) |
|---|---|---|---|---|---|
| 1204 | | | | | |
| 1205 | | | | | |
| 1206 [0001] | x | x.xxxxx | xx.xxxx | xxxxxxxxxx | xxxxxxxxxx |
| 1207 [0001] | x | x.xxxxx | xx.xxxx | xxxxxxxxxx | xxxxxxxxxx |
| 1208 [0001] | x | x.xxxxx | xx.xxxx | xxxxxxxxxx | xxxxxxxxxx |
| 1209 [0001] | | x.xxxxx | | xxxxxxxxxx | xxxxxxxxxx |

FIG. 13

| | Date | Pre-Event | | | Post-Event | | | Event Type | dp/dv | dq/dv |
|---|---|---|---|---|---|---|---|---|---|---|
| | | V | P | Q | V | P | Q | | | |
| 1320 | 281109 | 1.09 | 145 | 38 | 1.10 | 150 | 40 | Cap Bank ON | 500.0 | 200.0 |
| 1321 | 231109 | 1.06 | 145 | XX | 1.00 | XXX | XX | Cap Bank OFF | XXX.0 | XXX.0 |
| | 1301 | 1302 | 1303 | 1304 | 1305 | 1306 | 1307 | 1308 | 1309 | 1310 |

1300

SYSTEMS AND METHOD FOR OBTAINING A LOAD MODEL AND RELATED PARAMETERS BASED ON LOAD DYNAMICS

TECHNICAL FIELD

The present disclosure relates to systems and methods for obtaining and refining a load model and related parameters based on measurements of load modeling events in an electric power distribution system.

BRIEF DESCRIPTION OF THE DRAWINGS

Non-limiting and non-exhaustive embodiments of the disclosure are described, including various embodiments of the disclosure with reference to the figures, in which:

FIG. 1B illustrates adjustments to a load-side voltage in the electric power distribution system of FIG. 1A;

FIG. 10A and FIG. 10B illustrate a detailed block diagram of one embodiment of a load model parameter estimation module.

FIG. 11 illustrates one embodiment of a report containing load model parameters;

FIG. 13 illustrates one embodiment of a report containing information regarding conditions prior to a modeling event and after a modeling event.

DETAILED DESCRIPTION OF PREFERRED EMBODIMENTS

Figure 1A:
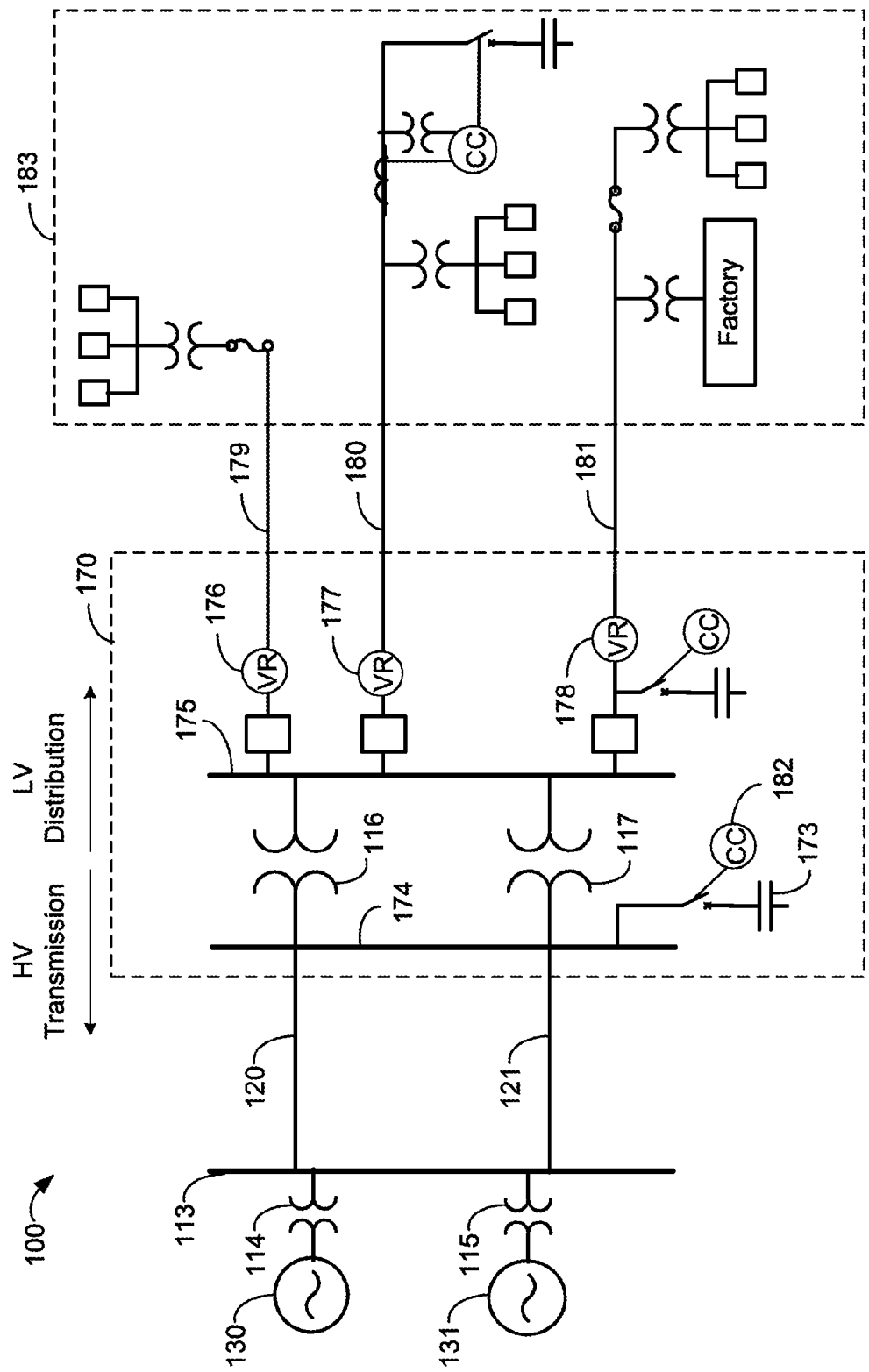
FIG. 1A illustrates one embodiment of a simplified one line diagram of an electric power distribution system from which data may be gathered and used to generate a load model.

The present disclosure relates to systems and methods for calculating a load model and associated tunable parameters that may be used to predict the behavior of loads connected to an electric power distribution system. Based upon the predicted behavior of the loads, optimized control strategies may be employed in the management of the electric power distribution system.

Any action which causes a disruption to the electric power distribution system (e.g., a change in voltage or frequency) may provide information regarding the composition or dynamics of connected loads. Such actions may be referred to as modeling events. Modeling events may occur with some frequency in electric power distribution systems. Accordingly, a robust load model may be developed and refined using data that is collected at a variety of times and under a variety of circumstances. A plurality of load models may be developed at various levels in an electric power distribution system (e.g., the system level, the substation level, the feeder level, etc.).

A variety of types of equipment deployed across an electric power distribution system may provide data that may be utilized in developing and refining a load model. Devices that control the voltage and/or frequency in an electric power distribution system may be utilized in conjunction with devices that measure various electrical parameters in the electric power distribution system. Communication among these devices may allow a load model to identify the type of event that causes a disruption to the electric power distribution system and the response of one or more loads to the disruption. Time synchronization of measured data and control instructions resulting in modeling events may facilitate communication among various devices.

Load models are mathematical functions that may be used to describe the behavior of loads connected to an electric power distribution system. Typically, load models do not predict variations in demand caused by customers requiring more or less power. Instead, load models capture variations in demand caused by changes in the supply voltage.

Load models may be classified as either static or dynamic. Static load models are defined by algebraic equations. Dynamic load models are defined by differential equations that capture the time evolution of the power demands of a load. Detailed dynamic simulations may require dynamic load models. Depending on the application for a particular simulation, in certain instances, static models may be used, while in other applications, both dynamic and static loads may be utilized.

The mathematical functions in load models include parameters that may be tuned so that the load model behaves like a particular physical load. In certain embodiments, the parameters may be tuned by measuring voltage, current, frequency, or other characteristics of power supplied to a load and then finding parameters, such that when power having the same characteristic is applied to the model, the model predicts the same power consumption that is provided to the physical load.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described will be illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product, including a machine-readable storage medium having stored thereon instructions that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1A illustrates an electric transmission and distribution system 100. Data may be gathered from a variety of points in system 100 and analyzed to develop and refine a load model that may be utilized to predict the response of a plurality of loads 183 under a variety of conditions. System 100 includes two generators 130 and 131, which are connected to step-up transformers 114 and 115. Step-up transformers 114 and 115 are connected to a transmission bus 113, which is in turn connected to transmission lines 120 and 121. Transmission lines 120 and 121 may be connected to a high voltage substation bus 174. Substation 170 may also include a low voltage substation bus 175 that is connected to the lower-voltage side of step-down transformers 116 and 117. A capacitor bank 173 may also be connected to high voltage substation bus 174. A capacitor bank controller 182 may selectively connect capacitor bank 173 to high voltage substation bus 174.

Step-down transformers 116 and 117 may separate a higher voltage transmission system from a lower voltage transmission distribution system. Low voltage substation bus 175 may provide power to a plurality of feeders 179, 180, and 181, which are in turn connected to the plurality of loads 183. To better control the voltage delivered to the loads, voltage regulators (VR) 176, 177, and 178 are installed on feeders 179, 180, and 181, respectively. A voltage supplied to a voltage regulator (e.g., the voltage of substation bus 175 supplied to any of voltage regulators 176, 177, or 178) may be referred to as a "line-side voltage," while a voltage supplied to a load by a voltage regulator (e.g., the voltage of any of feeders 179, 180, and 181) may be referred to as a "load-side voltage."

In circumstances where system 100 cannot supply sufficient power to satisfy the demands of all loads, a variety of control strategies may be utilized to maintain the stability of the system 100. For example, system 100 may selectively shed or "brown out" specified loads. A "brown out," as the term is used herein, refers to reducing a voltage supplied to a load in order to decrease power consumption of the load. Load shedding refers to disconnecting a load. Load shedding may refer to "rolling blackouts" (e.g., sequentially disconnecting certain loads during periods of high demand) of system 100 to reduce the load.

FIG. 1B illustrates one strategy to keep voltage within acceptable values by adjusting the load-side voltage. The present example will focus on feeder 179 and voltage regulator 176, shown in FIG. 1A, although the example could also be explained using feeder 180 or feeder 181 and the respective voltage regulators. In this example, electric power system 100, shown in FIG. 1A, operates to maintain the load-side voltage 192 on feeder 179, shown in FIG. 1A, within an acceptable lode-side voltage range 190 between a high setting 193 and a low setting 194, even though the line-side voltage 191 varies above and below high setting 193 and low setting 194. When the load-side voltage 192 approaches either high setting 193 or low setting 194, voltage regulator 176, shown in FIG. 1A, adjusts its output voltage by changing its "tap point," and thus, altering the ratio of turns between the primary and secondary windings.

FIG. 1B illustrates several tap changes, as line-side voltage 191 varies above, below, and between high setting 193 and low setting 194. The tap event that occurs at time T1 is enlarged. As shown, at time T1, load-side voltage 192 reaches high setting 193. As a result a tap change occurs, resulting in a lower load-side voltage 192 at time T1. The change in the load-side voltage 192 is referred to as $\Delta V$ 196.

The tap change event that occurs at time T1 may provide a data point for a load model. Electric power distribution system 100, for example, may measure the current and other electrical parameters associated with a particular feeder before and after the tap change event at time T1. The change in voltage $\Delta V$ 196, the current, and other electrical parameters may be related using mathematical models and various derived parameters. Modeling events, such as the tap changes illustrated in FIG. 1B, can be used as data points for generating a load model. Various electrical characteristics, such voltage (V), current (I), AC frequency (F), reactive power (Q) in volt-amperes reactive ($VA_R$), and real power (P) in watts, may be measured before and after the modeling event. In various embodiments, a system may be configured to receive data regarding a plurality of data points (e.g., such as the tap change event illustrated in FIG. 1B at time T1), and to generate a load model based on the plurality of data points. A load model describing, for example, how a load will respond to a change in voltage of magnitude ΔV 196, may allow a utility to more efficiently match generation and demand and to employ the most effective control strategies in response to circumstances in which demand exceeds generation. In certain embodiments, the detection of a sufficient change in voltage may be characterized as a modeling event, regardless of whether the device detecting the change in voltage has information regarding the cause of the change in voltage.

Figure 1C:
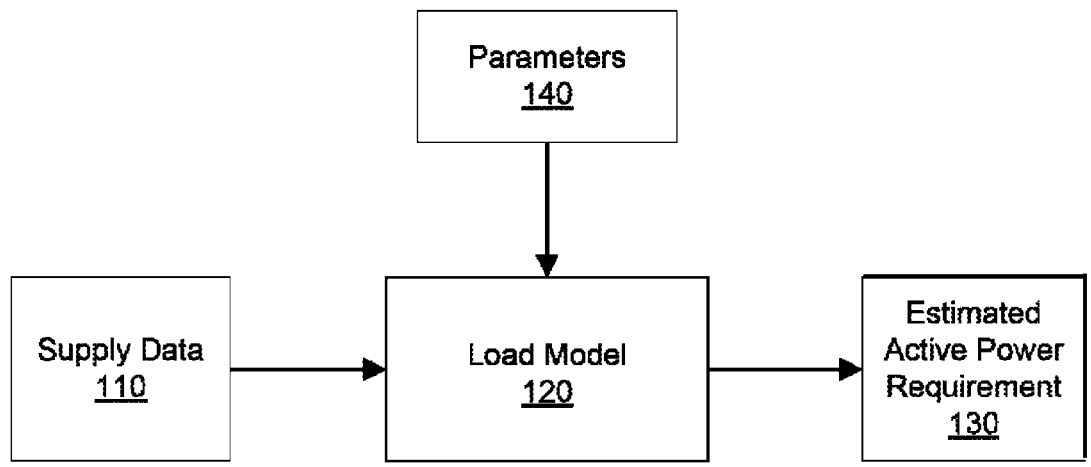
FIG. 1C depicts a load model that may be utilized in connection with the electric power distribution system of FIG. 1A that provides an estimate of an active power requirement based on supply data, various parameters, and a load model.

FIG. 1C depicts a load model 120 that provides an estimated active power requirement 130 based on supply data 110 (e.g., a particular voltage, change in voltage, current, frequency, or a change in some other electric characteristic). Load model 120 receives parameters 140 and tunes the mathematical functions that constitute the load model 120, so that the load model 120 behaves like a particular load. A change in supply data 110 may result in different estimated active power requirements 130 based on the type of load associated with parameters 140 provided to load model 120. For example, when a load is a constant impedance load, a change in the supplied voltage causes a change in the active power that is proportional to the square of the voltage variation, and set forth in Eq. 1.

$$P = \frac{V^2}{R} \qquad (\text{Eq. 1})$$

On the other hand, when a load is a constant power load, a change in the supplied voltage may not cause any change in the active power (e.g., an induction motor). To accommodate various types of loads, a load model 120 may include several tunable parameters 140. Further, a variety of types of load models may be selected. The tunable parameters and the selected load model may influence the accuracy of the estimated active power requirement 130 determined by load model 120. As used herein, the term load model refers to both a load model and the tunable parameters within the load model.

A variety of types of devices may contribute data that can be utilized in connection with the generation of a load model. For example, measurements of relevant data (e.g., V, I, F, P, and/or Q) can be taken by any appropriate device in electrical communication with an electric distribution system. In certain embodiments, devices that control the voltage in an electric power distribution system may be configured to record relevant data together with the type of event that caused a change in the system's voltage. Devices that control the voltage in an electric power distribution system may include voltage regulator controllers, capacitor bank controllers, switch controllers (for connecting and/or disconnecting loads, lines, transformers, etc.), transformer controllers, and the like. These devices may control the voltage in the electric power distribution system by connecting or disconnecting a capacitor bank, connecting or disconnecting a load, causing a voltage regulator to tap up or tap down, connecting or disconnecting a transformer, connecting or disconnecting a power line, and the like.

According to various embodiments, parameters 140 may be based upon data from a device that controls the voltage on a portion of an electric distribution system. Parameters 140 may be generated, for example, based upon one or more measurements of V, I, F, P, and/or Q, taken before and after a modeling event. Parameters 140 may be based upon a ratio of a change in power with respect to the change in voltage (ΔP/ΔV), and/or a change in the ratio of reactive power with respect to the change in voltage (ΔQ/ΔV), as observed by any device (such as a meter, sensor, or the like) in electrical communication with the relevant portion of the electric distribution system.

Using parameters 140, load model 120 may generate a model describing the type of loads and power consumption based on supply data 110. For example, load model 120 may determine based on the available data that a particular load includes 60% constant impedance loads and 40% constant power loads. Based on parameters 140 and load model 120, supply data 110 may be received, and an estimated active power requirement 130 may be generated based on the supply data 110.

Load models may be developed at any level within an electric power distribution system. In one embodiment, a load model may be developed at a substation level. In another embodiment, a load model may be developed at the feeder level, such that each feeder has its own load model. Still other embodiments may generate both a substation level model and feeder level models. Models at differing levels may be advantageous in different circumstances. For example, a brown-out control strategy may be more effective on a feeder with a large component of constant impedance loads, so a utility would be able to employ a voltage reduction scheme on such a feeder. In contrast, if a particular feeder has a large component of constant power loads, a brown-out control strategy may be less effective.

A variety of types of modeling events may be utilized in connection with the systems and methods disclosed herein. Generally, a modeling event may refer to any event that results in a change in voltage in an electric power distribution system. More particularly, the term modeling event encompasses, but is not limited to: adjustments of voltage regulators, connection/disconnection of a capacitor bank, connection/disconnection of a particular load, connection/disconnection of a secondary transformer, connection/disconnection of a secondary transmission line, and may even include unplanned events such as a loss of a load, start of a large motor, loss or change of an intermittent power source (wind, solar, or the like) near a load center, faults in power system equipment, and the like.

Eq. 2 shows the static load model recommended by the IEEE task force on load representation for dynamic performance. Eq. 2 provides a starting point for several load models, each of which is discussed in greater detail below, and each of which may be utilized in connection with any of the embodiments discussed herein. Other load models, which are not discussed herein, may be known to one having skill in the art.

$$\frac{P}{P_0} = K_z\left(\frac{V}{V_0}\right)^2 + K_i\frac{V}{V_0} + K_c + \qquad (\text{Eq. 2})$$
$$K_1\left(\frac{V}{V_0}\right)^{n_{p1}}(1 + n_{f1}(f - f_0))\Phi(V, V_{a1}, V_{b1}) +$$
$$K_2\left(\frac{V}{V_0}\right)^{n_{pv2}}(1 + n_{f2}(f - f_0))\Phi(V, V_{a2}, V_{b2})$$

In Eq. 2, $P_o$, is the initial real power and $V_o$ is the voltage associated with $P_o$. In this equation, $f_o$ is the nominal frequency (e.g., 60 Hz or 50 Hz). Voltage (V) and frequency (f) are independent variables, while the other variables represent tunable parameters that may be customized to a particular load. The IEEE task force recommendation includes threshold parameters used to linearly reduce the fourth and fifth terms of Eq. 2 to zero as the voltage goes below these threshold parameters. The function is defined by Eq. 3.

$$\Phi(V, V_a, V_b) = \begin{cases} 1, & \text{if } V \geq V_a \\ 0, & \text{if } V < V_b, \; V_a \geq V_b \\ \frac{V - V_b}{V_a - V_b}, & \text{otherwise,} \end{cases} \quad \text{(Eq. 3)}$$

Figure 2A:
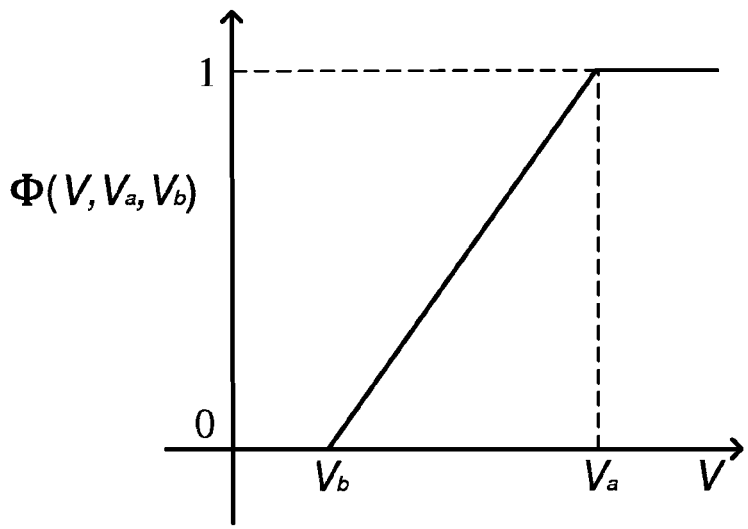
FIG. 2A shows the shape of the function defined by Eq. 3.

FIG. 2A shows the shape of the function defined by Eq. 3. This function is intended to model loads, such as discharge lighting. The power consumed by a discharge lighting goes to zero abruptly when voltage is such that the arc cannot reignite. In addition to the threshold parameters, the following parameters of Eq. 4 are larger than zero.

$$K_z, K_i, K_c, K_1, K_2 \in \mathfrak{R}^+ \quad \text{(Eq. 4)}$$

The sum of these parameters must be equal to one, as shown in Eq. 5.

$$1 = K_z + K_c + K_1 + K_2 \quad \text{(Eq. 5)}$$

The ZIP load model for power flow analysis can be obtained by setting the following constraints on the standard model.

$$K_1, n_{v1}, n_{f1}, K_2, n_{v2}, n_{f2} = 0 \quad \text{(Eq. 6)}$$

With the constraints of Eq. 6, Eq. 2 simplifies to Eq. 7.

$$\frac{P}{P_0} = K_z \left(\frac{V}{V_0}\right)^2 + K_i \left(\frac{V}{V_0}\right) + K_c \quad \text{(Eq. 7)}$$

The exponential load model for power flow analysis can be obtained by applying the constraints of Eq. 8 on the standard model, shown in Eq. 2.

$$K_z, K_i, K_c, V_{a1}, V_{b1}, V_{a2}, V_{b2} = 0 \quad \text{(Eq. 8)}$$

The constraints of Eq. 8 imply that the function of Eq. 3 simplifies as shown in Eq. 9.

$$\Phi(V, V_{a1}, V_{b1}) = 1$$

$$\Phi(V, V_{a2}, V_{b2}) = 1 \quad \text{(Eq. 9)}$$

With the constraints of Eq. 8 and Eq. 9, Eq. 2 simplifies to Eq. 10.

$$\frac{P}{P_0} = K_1 \left(\frac{V}{V_0}\right)^{n_{v1}} (1 + n_{f1}(f - f_0)) + K_2 \left(\frac{V}{V_0}\right)^{n_{pv2}} (1 + n_{f2}(f - f_0)) \quad \text{(Eq. 10)}$$

A close match to the load model used by Power System Simulator for Engineering ("PSS/E") for power flow analysis can be obtained by setting the constraints of Eq. 11 on Eq. 2.

$$K_c, n_{v1}, n_{f1}, K_i, V_{b1}, V_{b2}, n_{f2} = 0$$

$$V_{a1} = \text{PQBRAK}$$

$$V_{a2} = 0.5$$

$$n_{v2} = 1 \quad \text{(Eq. 11)}$$

PQBRAK is a PSS/E solution parameter that is one of the following values: 0.6, 0.7, or 0.8 p.u. In this model, PQBRAK represents the constant power fraction of the load and represents the constant current fraction of the load. With the constraints of Eq. 11, Eq. 2 simplifies to Eq. 12.

$$\frac{P}{P_0} = K_z \left(\frac{V}{V_0}\right)^2 + K_c \Phi(V, V_{a1}, V_{b1}) + K_i \frac{V}{V_0} \Phi(V, V_{a2}, V_{b2}) \quad \text{(Eq. 12)}$$

Figure 2B:
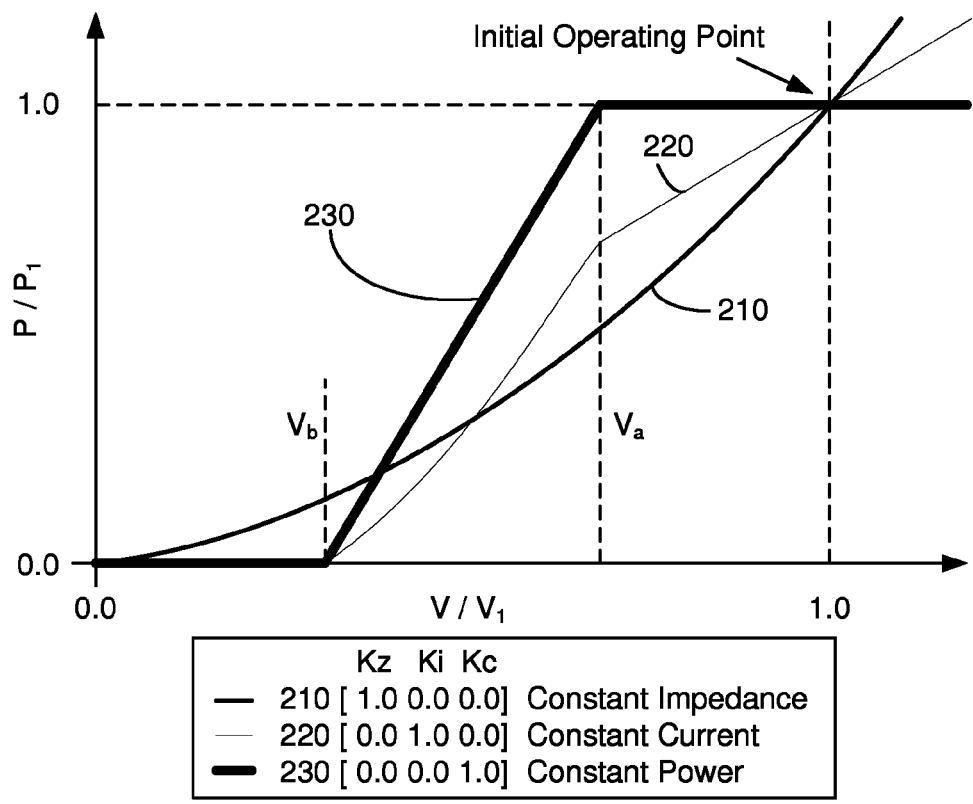
FIG. 2B shows the shape of the function defined by Eq. 12 for a constant impedance load, a constant currant load, and a constant power load.

FIG. 2B illustrates Eq. 12 for three sets of values of $K_z$, $K_i$, $K_c$, which correspond with a constant impedance load, a constant current load, and a constant power load. Line 210 represents a constant impedance load, line 220 represents a constant current load, and line 230 represents a constant power load.

Figure 3:
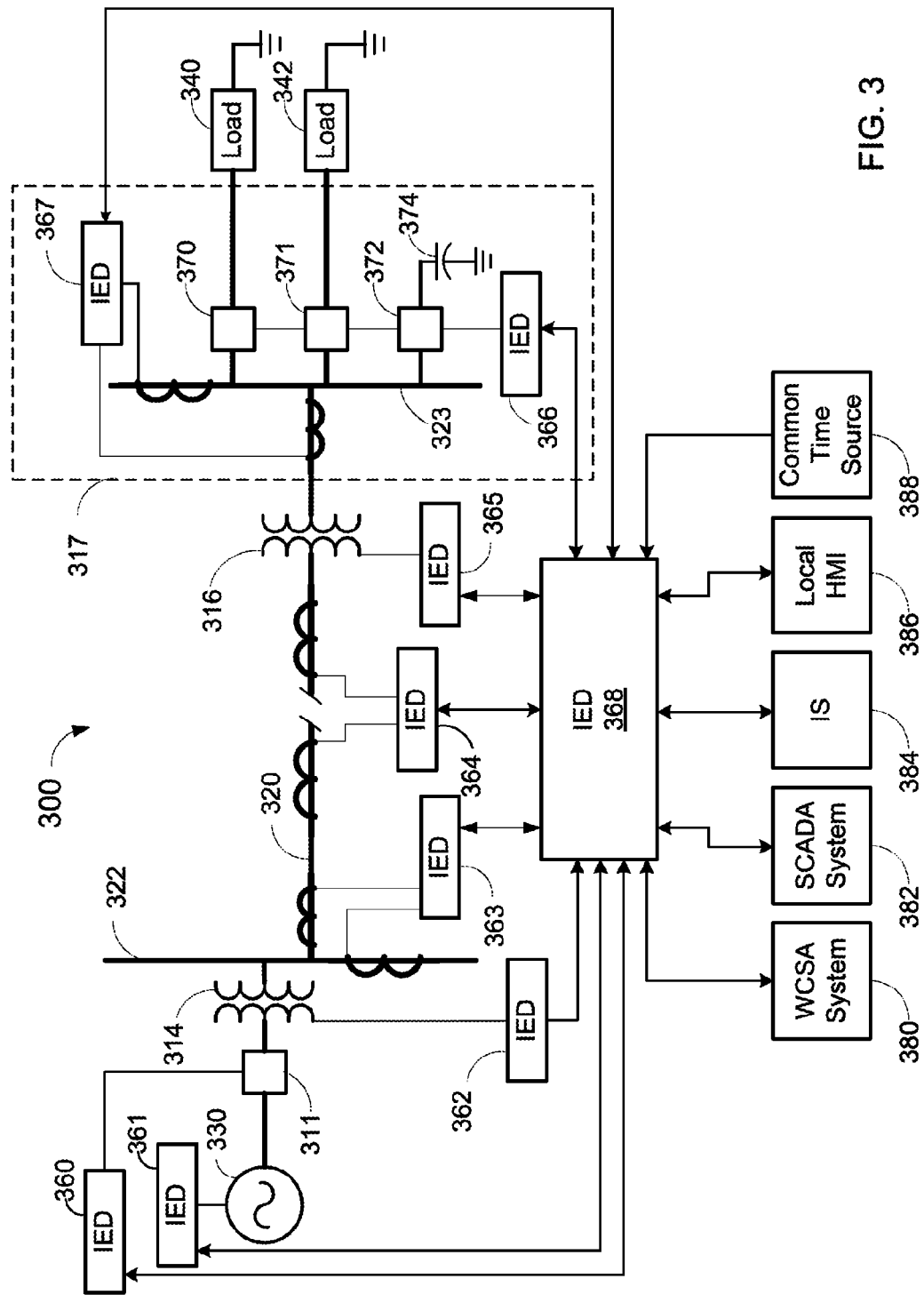
FIG. 3 illustrates a simplified one line diagram of an electric power distribution and control system from which data may be gathered and used to generate a load model.

FIG. 3 illustrates a simplified one line diagram of an electric power distribution and control system 300 from which data may be gathered to generate and tune a load model. Although illustrated as a one-line diagram, system 300 may represent a three-phase power system.

IEDs 360-368, shown in FIG. 3, may be configured to control, monitor, protect, and/or automate system 300. As used herein, an IED may refer to any microprocessor-based device that monitors, controls, automates, and/or protects monitored equipment within an electric power distribution system. Such devices may include: remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. IEDs may gather status information from one or more pieces of monitored equipment. IEDs may also receive information concerning monitored equipment using sensors, transducers, actuators, and the like.

IEDs 360-368 may also transmit information gathered about monitored equipment. IEDs may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be synchronized as synchrophasors), events, fault distances, differentials, impedances, reactances, frequency, and the like. IEDs may also communicate settings information, IED identification information, communications information, status information, alarm information, and the like. Information of the types listed above, or more generally, information about the status of monitored equipment is referred to as monitored equipment data.

IEDs 360-368 may also issue control instructions to monitored equipment in order to control various aspects of the monitored equipment. For example, an IED may be in communication with a circuit breaker, and may be capable of sending an instruction to open or close the circuit breaker, thus connecting or disconnecting a particular component of a power system. In another example, an IED may be in communication with a recloser and capable of controlling reclosing operations. In another example, an IED may be in communication with a voltage regulator and may be capable of instructing the voltage regulator to tap up and/or down. Other examples of control instructions that may be implemented using IEDs may be known to one having skill in the art, but are not listed here. Information of the types listed above, or more generally, information or instructions directing an IED or other device to perform a certain action is referred to as control instructions.

IEDs 360-368 may be linked together using a data communications network, and may further be linked to a central monitoring system, such as a wide area control and situational awareness (WCSA) system 380, a SCADA system 382, or an information system 384. The embodiment of FIG. 3 illustrates a star topology, having IED 368 at its center; however, other topologies are also contemplated. The data communications network of FIG. 1 may include a variety of network technologies and may comprise network devices such as modems, routers, firewalls, virtual private network servers, and the like. IEDs and other network devices are connected to the communications network through a network communications interface comprised within each device.

System 300 may be configured to transmit electric power produced by a generator 330 to loads 340 and 342. A step-up power transformer 314 may be configured to increase the generated waveform to a higher voltage sinusoidal waveform. A transmission bus 322 may be connected to a transmission line 320. Step-down transformer 316 may be located at or near a substation 317 and may be configured to transform the higher voltage sinusoidal waveform to lower voltage sinusoidal waveform that is more suitable for distribution to loads 340 and 342. In order to maintain voltage within certain limits for safe and reliable power distribution, voltage transformers 314 and 316 may periodically make tap position changes as instructed by IEDs 362 and 365, respectively.

Substation 317 may comprise various components, including a substation bus 323; IEDs 366 and 367; breakers 370, 371, and 372; and capacitor bank 374. Breakers 370, 371, and 372 may be configured to be selectively actuated to connect loads 340 and 342, and capacitor bank 374 to substation bus 323. Capacitor bank 374 may assist in maintaining a proper balance of reactive power in system 300. IED 366 may be configured to issue control instructions to breakers 370, 371, and 372. IED 367 may be configured to monitor the current and voltage of substation bus 323.

IEDs 360-368 are connected at various points to system 300. IED 364 may be configured to monitor electrical conditions on transmission line 320. IED 363 may monitor conditions on transmission bus 322. IED 361 may monitor and issue control instructions to generator 330, while IED 360 may issue control instructions to breaker 311. IEDs 362 and 365 may be in communication with step-up transformer 314 and step-down transformer 316, respectively.

In certain embodiments, including the embodiment illustrated in FIG. 3, communication among various IEDs and/or higher level systems (e.g., WCSA system 380, SCADA system 382, or IS 384) may be facilitated by a central IED 368. In various embodiments, IED 368 may also be embodied as an automation controller, and may pecifically be embodied as any of product nos. SEL-2020, SEL-2030, SEL-2032, SEL-3332, or SEL-3530, available from Schweitzer Engineering Laboratories, Inc. of Pullman, Wash., and also as described in U.S. Pat. No. 5,680,324, the entirety of which is incorporated herein by reference.

IEDs 360-367 may communicate information to IED 368 including, but not limited to: status and control information about the individual IEDs, IED settings information, calculations made by individual IEDs, event (fault) reports, communications network information, network security events, monitored equipment information, and the like.

IED 368 may include a local human machine interface (HMI) 386. Local HMI 386 may be used to change settings, issue control instructions, retrieve an event (fault) report, retrieve data, and the like. IED 368 may also be connected to a common time source 388.

In certain embodiments, IED 368 may generate a common time signal based on common time source 388 that may be distributed to connected IEDs 360-367. Based on the common time signal, various IEDs may be configured to collect time-aligned data points, including synchrophasors, and to implement control instructions in a time coordinated manner. WCSA system 380 may receive and process the time-aligned data. Time synchronization may be helpful for data organization, real-time decision-making, as well as post-event analysis, including load modeling. Common time source 388 may be any time source that is an acceptable time source for synchronization, including but not limited to: a voltage controlled temperature compensated crystal oscillator, Rubidium and Cesium oscillators with or without a digital phase locked loop, and MEMs technology, which transfers the resonant circuits from the electronic to the mechanical domains. In the absence of a discrete common time source, IED 368 may serve as a common time source by distributing a time synchronization signal based on an internal time source. In certain embodiments, the Global Positioning System (GPS) may serve as a common time source. In other embodiments, the common time source may be provided by a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, and/or another time transmission protocol or system.

In various embodiments, data may be transferred among IEDs 360-368 using a wide variety of data transfer protocols and physical media. In certain embodiments, data may be transferred asynchronously, while in other embodiments, data may be transferred according to the IEEE C37.118 protocol for streaming data. In embodiments utilizing asynchronous data transfers, data may be obtained in a CONTRADE format and converted into a CSV format before processing. Data received as an IEEE C37.118 stream may be buffered and stored in a CSV file before processing.

In one embodiment, IED 367 may be configured to determine and/or calculate data sets representing electrical conditions associated with substation bus 323. Such electrical conditions may include voltage (V), current (I), AC frequency (F), reactive power (Q) in volt-amperes reactive ($VA_R$), and real power (P) in watts. Each data set may also include a measurement time (T), which may be derived based on a common time signal distributed by IED 368. In particular, IED 367 may record a plurality of data sets both before, during, and after transformer 316 "taps up" or "taps down" in order to change the voltage output of transformer 316.

Any action which causes a change to any of V, I, F, Q, and/or P in an electric power distribution system may provide information regarding the composition or dynamics of connected loads. For example, every time transformer 316 adjusts its output voltage up or down, the response of loads 340 and 342 may be observed by monitoring the electrical characteristics of substation bus 323. Similarly, when capacitor bank 374 is connected to substation bus 323 by closing breaker 372, the response of substation bus 323 is influenced by the dynamics of loads 340 and 342. In another example, load dynamics may be recorded when a fault is detected in connection with load 340 and breaker 370 is opened. A variety of other conditions may also provide information regarding load dynamics (e.g., starting a large motor, connecting a distributed generation source, etc.).

Another example of a modeling event may include connecting/disconnecting a secondary transformer. Referring back to FIG. 1, transformers 116 and 117 are connected between high voltage substation bus 174 and low voltage substation bus 175. In one example, transformer 117 is initially disconnected from busses 174 and 175. When transformer 117 is connected, the series reactance between busses 174 and 175 is reduced (i.e., the series reactance is higher when only transformer 116 connects busses 174 and 175, and the series reactance is lower when transformers 116 and 117 connect busses 174 and 175). The change in reactance caused by connecting transformer 117 results in a change in Q. Accordingly, a change in the ratio of V and Q (ΔV/ΔQ) can be observed. Conversely, disconnecting either transformer 116 or 117 may result in another modeling event.

Still another example of a modeling event may include connecting a secondary transmission line. Again referring to FIG. 1, transmission lines 120 and 121 both connect busses 113 and 174. In one example, transmission line 121 may be disconnected. When transmission line 121 is connected at one end, the impedance between busses 113 and 174 changes, leading to a change in supply voltage. When transmission line 121 is then connected at the other end, the impedance between busses 113 and 174 changes yet again, leading to a change in supply voltage. A change in the ratio of V and Q (ΔV/ΔQ) and in the ratio of V and P (ΔV/ΔP) could be observed with either or both connections. Another modeling event may be observed if either of transmission lines 120 and 121 are removed from service.

Any action that provides information regarding the composition or dynamics of connected loads may be referred to as a modeling event. Modeling events may occur with some frequency in electric power distribution systems, and accordingly, a number of data sets may be acquired under a variety of conditions and at a variety of times. Each adjustment or disturbance may be analyzed to determine if the event is a valid modeling event, and if so, the data may be used as an input to a load model that describes the sensitivity of connected loads to variations in electrical characteristics. The data gathered in connection with each modeling event may be utilized to re-calculate a load model to improve accuracy in a learning or load-following mode. Following each modeling event, the time evolution of a load's reaction may be observed and recorded until a steady state condition is reached.

By recording data measurements each time there is a disturbance in an electric distribution system, a load model may be developed and/or updated. Returning to a discussion of FIG. 3, the characteristics of loads 340 and 342 are indicated in the response to a disturbance. These characteristics depend on the mixture of various load types. For example, loads 340 and 342 may include constant-power loads (e.g., switching power supplies, induction motors). Loads 340 and 342 may also include constant impedance loads, such as incandescent lighting and resistance heating (e.g., dryers, baseboard heaters, stoves, hot water heaters).

The correlation between types of loads and variations in electrical characteristics supplying the loads may be illustrated by an example in which the voltage output of transformer 316 is stepped up. The step up increases the voltage on substation bus 323. In response to the higher voltage, the power consumption and reactive power of constant impedance loads increases. In contrast, constant power loads draw less current and reactive power decreases. By determining which loads include a substantial proportion of constant impedance loads, system 300 may reduce the voltage supplied to constant impedance loads ("browning out the loads") to reduce power consumption. In contrast, reducing voltage supplied to constant power loads results in the loads drawing increased current and aggravating voltage stability. Accordingly, when a load is identified as including a substantial proportion of constant power loads, an appropriate power reduction strategy may be to disconnect the loads, if no other alternative is available.

In one embodiment, each load connected to an electric distribution system may be locally characterized (e.g., at the substation level) in terms of its sensitivity, both with respect to active power and with respect to reactive power as expressed as Eq. 13.

$$\text{Sensitivity}_P = \frac{dP}{dV}$$
$$\text{Sensitivity}_Q = \frac{dQ}{dV}$$
(Eq. 13)

When evaluated for constant impedance loads, $\text{Sensitivity}_P$ is positive and $\text{Sensitivity}_Q$ is positive. In contrast, when evaluated for constant power loads, $\text{Sensitivity}_P$ is zero and $\text{Sensitivity}_Q$ is zero. In some embodiments, each load may be further characterized by the active and reactive power reduction attributable a voltage reduction of 1%, based on the actual power flow at the time. Such characterizations may be made on a breaker, transformer, or station level. One load shedding scheme optimized based on loads may first reduce voltages to loads that result in the maximum power gain. If additional reduction is necessary, the load shedding scheme may next disconnect constant power loads.

Certain embodiments disclosed herein may utilize time-synchronized measurements. Such embodiments may allow for comparison of events across a large geographic distance and may provide an understanding of the interaction between multiple events on system 300. Certain embodiments may also account for variations in load types based on the season, day of the week, and time of the day in order to more accurately model connected loads and make predictions regarding the response of load to voltage and frequency excursions, including both unplanned disturbances (e.g., lightening strikes, equipment failures, etc.) and disturbances caused by, or as a result of, control actions. One of skill in the art recognizes that the characteristics of a load may vary based on the season, day of the week, or time of day. For example, in the summertime a large proportion of the load may be attributable to air conditioning, while in the wintertime, a large proportion of the load may be attributable to lighting and heating. Similarly, loads on week days may vary from loads on weekends.

Improved understanding of the composition of loads 340 and 342 may allow for improved power flow management, improved estimation of voltage stability, improved ability to shed loads under stressed conditions, and improved ability to restore power delivery following an outage. In certain embodiments, analysis of modeling events and generation of a load model may be performed locally (e.g., each IED may be configured to perform the analysis and to calculate a load model for associated loads). The load model may be communicated to other IEDs to be incorporated with load models describing other connected loads in order to create a system-wide summary of load dynamics.

In other embodiments, an IED may be configured to measure data relevant to modeling events and to transmit the measurements to another IED for processing. In such embodiments, a central IED may receive and process measurements received from a plurality of IEDs. A central IED may be configured to make system-wide decisions with respect to load shedding. In such embodiments, a load dynamics report may be generated by each IED. A load dynamics report may comprise a set of data describing pre-event status, post-event status, an event type, and observed load dynamics. The central IED may utilize the load dynamics report to create a load model for each connected load.

Figure 4:
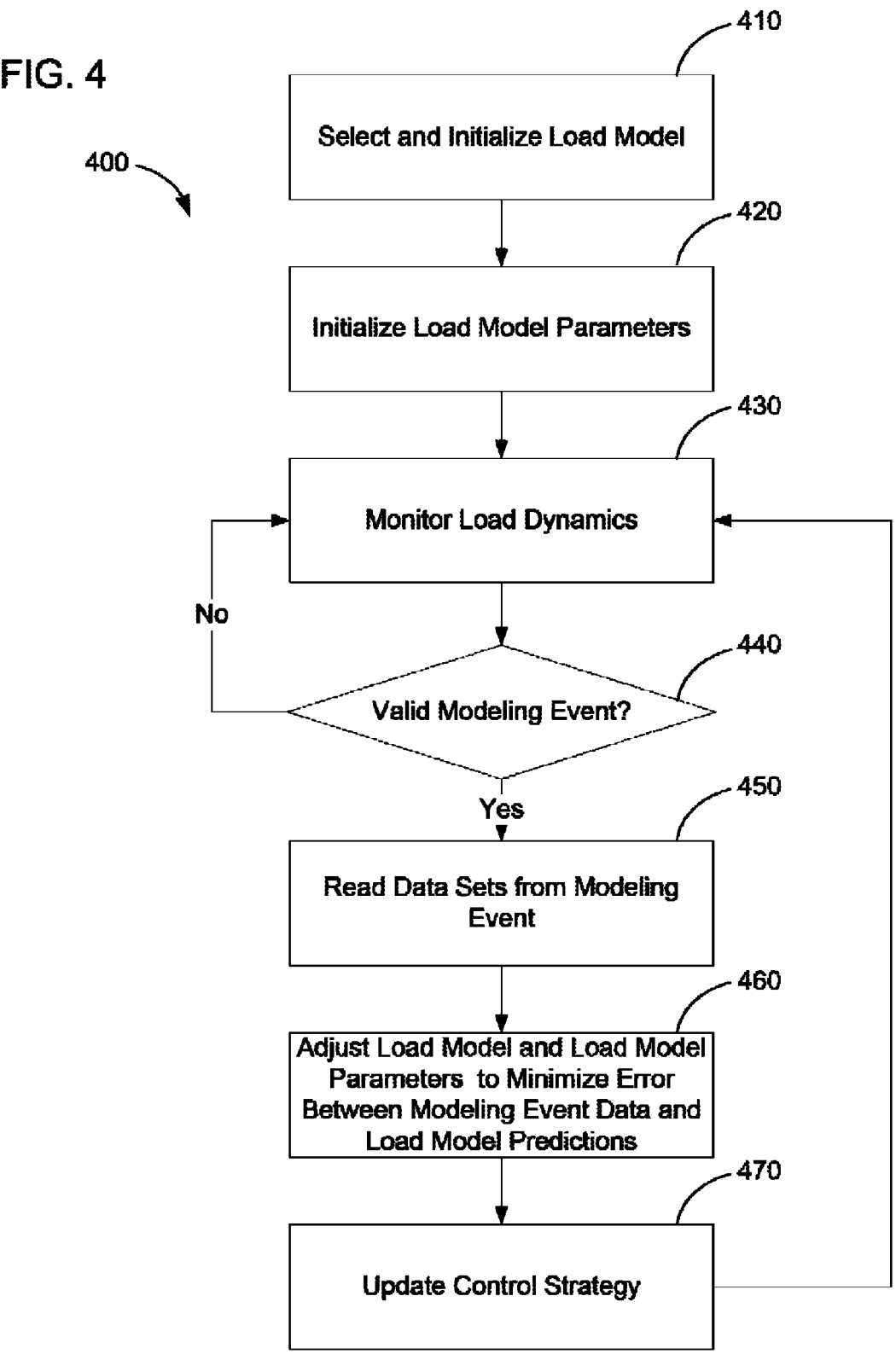
FIG. 4 illustrates a flow chart of one embodiment of a method for creating a load model based on data collected in connection with one or more modeling events.

FIG. 4 illustrates a flow chart of one embodiment of a method 400 for creating a load model based on load dynamics and data sets collected in connection with one or more modeling events. At 410, a load model may be selected and initialized. A load model may be selected in a variety of ways, including: user selection, simulations results, statistical information, preset defaults established by an equipment manufacturer, etc. As appropriate, any of the static or dynamic load models, described above, may be initially selected. At 420, load model parameters appropriate to the selected load model may be initialized. The initial values of load model parameters may also be determined in a variety of ways, including: user selection, simulations results, statistical information, preset defaults established by an equipment manufacturer, etc.

At 430, monitoring of load dynamics begins. Monitoring of load dynamics may comprise monitoring characteristics (e.g., V, I, P, Q, etc.) of electrical power supplied to a particular load, as discussed above in connection with the embodiment illustrated in FIG. 3. Changes in any of the monitored electrical characteristics may prompt an analysis at 440 to determine whether the change in load dynamics meets specified criteria defining a valid modeling event. As discussed above, a wide variety of control actions (e.g., adjustments of voltage regulators, connection/disconnection of a capacitor bank, connection/disconnection of a particular load, connection/disconnection of a secondary transformer, connection/disconnection of a secondary transmission line), and unplanned actions (e.g., faults associated with certain loads, lightening discharges, etc.) may constitute valid modeling events. The criteria defining a valid modeling event may be specified by a user or may have default criteria established by an equipment manufacturer. In certain embodiments, steps 410 and 420 may be omitted, and an initial load model may not be created until a valid modeling event has occurred.

After identifying a valid modeling event at 450, data sets are read relating to the modeling event. The data sets may comprise a plurality of individual readings of electrical characteristics before, during, and after the modeling event. In one embodiment, each data set may contain a voltage magnitude measurement ($V_i$), a frequency measurement ($F_i$), a power measurement ($P_i$), and a measurement time ($T_i$). In certain embodiments, data sets may be collected from any number of IEDs in electrical communication with an electric power distribution system. Such IEDs may be distributed across a wide geographic area, and the data may be compared using a common time reference to sequence the data.

At 460, adjustments to the load model and the load model parameters may be made to minimize errors between the modeling event data and load model predictions. In a case of n data sets, where $p_i$ represents the power obtained using the load model, the then existing load model parameters may be used in a minimization function, and the load model parameters may be tuned to minimize Eq. 14.

$$\varepsilon = \sum_{i=0}^{n} (p_i - P_i)^2 \quad \text{(Eq. 14)}$$

A variety of methods may be utilized to minimize the result of Eq. 14, including the methods described in A direct search optimization method that models the objective and constraint functions by linear interpolation, in Advances in Optimization and Numerical Analysis eds., 51-67 (S. Gomez et al. eds., 1992), which is incorporated herein by reference in its entirety. In certain embodiments, any values generated by the load model outside the range of voltages and frequencies spanned by the input data sets may be deemed invalid. In this way, actual recorded data may impose boundaries on results predicted by the load model.

At 470, a control strategy may be updated based on adjustments to the load model and load model parameters. As discussed above, certain loads that consume less power when a supply voltage is reduced may be targeted first under stressed conditions. In one embodiment, updating a control strategy may include determining which loads may be intentionally "browned out." In another example, where control of load shedding decisions is determined at the substation level, updating a control strategy may include quantifying both the sensitivity of specific loads to voltage reductions as well as the criticality of each load. Based on these factors, the controller may optimize control actions to preserve power to critical loads, reduce voltages supplied to certain constant impedance loads, and shed certain constant power loads.

In another example, a voltage regulator controller may use a load model to predict whether a particular control strategy will be successful. Under stressed conditions, a particular condition may dictate that the output voltage of a voltage regulator should be raised. If the load supplied by the voltage regulator includes substantial constant power loads, a load model may predict that an action to step up a voltage may actually cause a voltage decrease or may result in an increase that is smaller than would be satisfactory to alleviate the problem. In such a case, the voltage regulator control may refrain from the counterproductive or mediocre control action of attempting to step up its output voltage. Such a system may guard against voltage collapses.

In yet another example, load model parameters may be provided to a real time voltage collapse mitigation system. The real time voltage collapse mitigation system may utilize the load model parameters to more accurately simulate the behavior of the power system. More accurate simulations may contribute to reducing the occurrence and size of voltage collapse related blackouts. One approach for using a load model in connection with a real time voltage collapse mitigation system is described in detail in M. Donolo et al., *Monitoring and Mitigating the Voltage Collapse Problem in the Natal Network*, IEEE Power Systems Conference and Exposition, Mar. 18, 2009, pages 1-5 (the "Natal Network Paper"), which is incorporated herein by reference.

In various embodiments, a real time voltage collapse mitigation system like the system presented in the Natal Network Paper, may use a system integrity protection scheme ("SIPS"). The SIPS may choose to shed load from a list of loads, which may be prioritized according to the load models associated with each load. For example, constant power loads may have a high priority because shedding these loads provided the most relive during voltage collapse.

Figure 5:
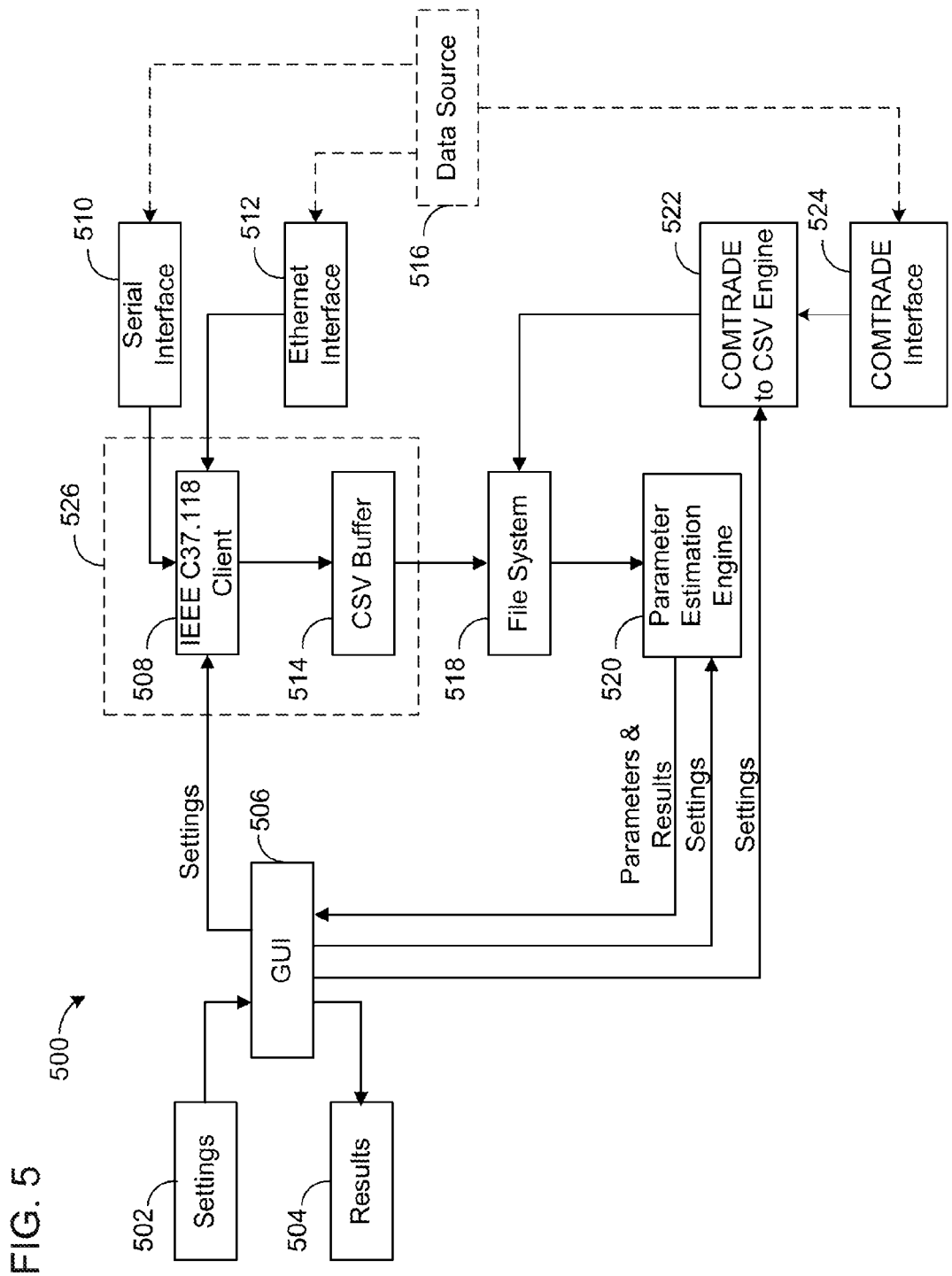
FIG. 5 illustrates an information flow diagram of one embodiment of a load model estimation program.

FIG. 5 illustrates an information flow diagram of one embodiment of a load characterizing system 500. Load characterizing system 500 includes a Graphic User Interface (GUI) 506, an IEEE C37.118 interface 526, a COMTRADE interface 524, and a parameter estimation engine 520.

GUI 506 may allow a user to input settings 502 and observe results 504, including a load model and results generated by parameter estimation engine 520. In certain embodiments, GUI 506 may plot the real and reactive power based on measurements and may also plot comparisons of measurements and real and reactive power values calculated by parameter estimation engine 520.

Settings inputted to GUI 506 may be transferred to IEEE C37.118 client 508, to parameter estimation engine 520, or to COMTRADE to CSV engine 522. Such settings may include, among other things, the length of the CSV buffer, selection of individual CSV files for processing, or selection of individual COMTRADE files for processing.

A data source 516 (e.g., an IED or piece of monitored equipment) may provide data to load characterizing system 500 in a variety of formats and via a variety of physical interfaces. In the illustrated embodiment, data source 516 may transfer data via any one of a serial interface 510, an Ethernet interface 512, or a COMTRADE interface 524. Data may be communicated to an IEEE C37.118 client 508 by either serial interface 510 or Ethernet interface 512. After processing by IEEE C37.118 client 508, CSV data may be accumulated in a CSV buffer 514 before transfer to a file system 518. Information provided to load characterizing system 500 via COMTRADE interface 524 may be converted by COMTRADE to CSV engine 522 before transfer to a file system 518. In other embodiments, alternative interfaces (e.g., a USB interface, an IEEE 1394 interface, an IEEE 1284 interface, a SATA interface, an eSATA interface, PCI, etc.) may be utilized together with appropriate data communication protocols.

Parameter estimation engine 520 may process data received from data source 516 and manipulate various load models and parameters to minimize errors between load model predictions and the received data. Parameter estimation engine 520 may receive from file system 518 a CSV input file and execute an algorithm for calculating a load model, such as the algorithm discussed above in connection with FIG. 4. In one embodiment, the CSV data passed to parameter estimation engine 520 may include five columns of floating point numbers. The data included in the columns may include time in seconds, voltage, frequency, active power, and reactive power. The generated load model, together with simulation results based on the load model may be returned to GUI 506 for display to a user.

Figure 6:
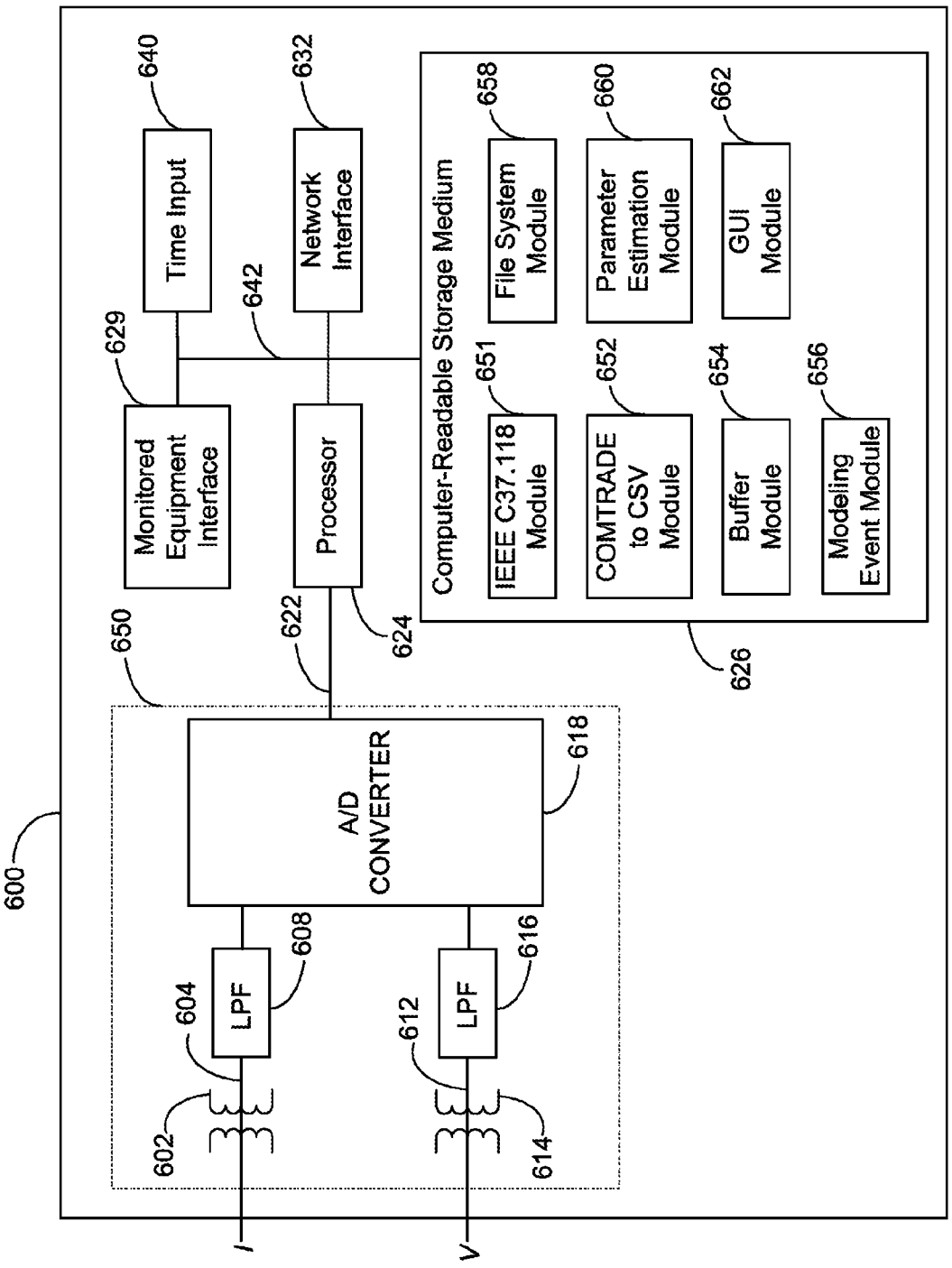
FIG. 6 illustrates an exemplary block diagram of an IED configured to collect electrical measurements and generate a load model based on the collected electrical measurements.

FIG. 6 illustrates an exemplary block diagram of an IED 600 configured to calculate a load model. IED 600 includes a network interface 632 configured to communicate with a data network. IED 600 also includes a time input 640, which may be used to receive a time signal. The received time signal may be used to record the time of occurrence of certain events. In certain embodiments, a common time reference may be received via network interface 632, and in such embodiments, time input 640 may not be necessary. For example, the IEEE 1588 protocol may be utilized to transmit a common time reference via network interface 632. A monitored equipment interface 629 may be configured to receive status information from and issue control instructions to a piece of monitored equipment. Monitored equipment interface 629 may be embodied as a serial interface, an Ethernet interface, a COMTRADE interface, and the like. A data bus 642 may link monitored equipment interface 629, time input 640, network interface 632, and a computer-readable storage medium 626 to a processor 624.

Processor 624 may be configured to process communications received via network interface 632, time input 640, and monitored equipment interface 629. Processor 624 may operate using any number of processing rates and architectures. Processor 624 may be configured to perform various algorithms and calculations described herein. Processor 624 may be embodied as a general purpose integrated circuit, an application specific integrated circuit, a field-programmable gate array, or other programmable logic device.

Computer-readable storage medium 626 may be the repository of various software modules configured to perform various functions described herein. For example, IEEE C37.118 module 651 may be configured to communicate according to the IEEE C37.118 protocol. COMTRADE to CSV module 652 may be configured to convert data from a COMTRADE format to a CSV format. Buffer module 654 may be configured to receive a streaming output from COMTRADE to CSV module 652 and temporarily store the resulting CSV data before processing. Modeling event module 656 may be configured to identify conditions indicative of a valid modeling event. File system module 658 may be configured to interface hardware resources of IED 600 with various software modules. Parameter estimation module 660 may be configured to perform the calculation associated with calculating a load model describing load sensitivity to variations in supply voltage caused by one or more modeling events. GUI module 662 may be configured to provide a graphical user interface that allows a user to input various parameters and view the results of modeling event data and one or more load models.

In certain embodiments, IED 600 may include a sensor component 650. In the illustrated embodiment, sensor component 650 is configured to gather data directly from power system equipment such as a conductor (not shown) a transformer, or the like using a current transformer 602 and/or a voltage transformer 614. Voltage transformer 614 may be configured to step-down the power system's voltage (V) to a secondary voltage waveform 612 having a magnitude that can be readily monitored and measured by IED 600. Similarly, current transformer 602 may be configured to proportionally step-down the power system's line current (I) to a secondary current waveform 604 having a magnitude that can be readily monitored and measured by IED 600. Low pass filters 608, 616 respectively filter the secondary current waveform 604 and the secondary voltage waveform 612. An analog-to-digital converter 618 may multiplex, sample, and/or digitize the filtered waveforms to form corresponding digitized current and voltage signals.

A/D converter 618 may be connected to processor 624 by way of a bus 622, through which digitized representations of current and voltage signals may be transmitted to processor 624. In various embodiments, the digitized current and voltage signals may be compared against specified conditions (e.g., to determine if a valid modeling event has occurred).

Figure 7A:
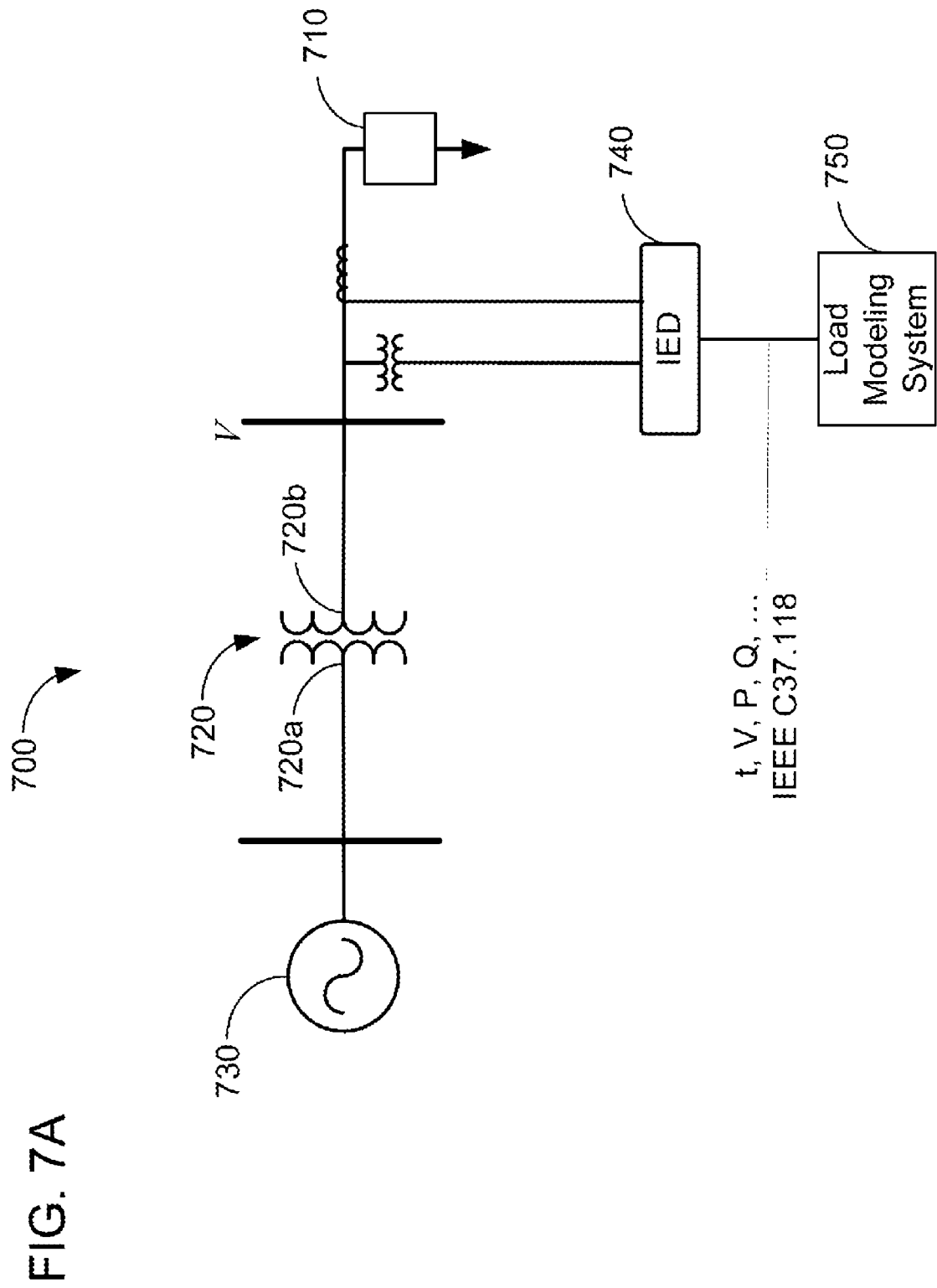
FIG. 7A illustrates one embodiment of a system configured to implement a relay-based load modeling algorithm.

FIG. 7A illustrates one embodiment of a system 700 configured to implement a relay-based load modeling algorithm. System 700 comprises a generator 730 in electrical communication with a primary side 720a of a transformer 720. Transformer 720 comprises an under load tap changer, which allows the voltage on a secondary side 720b to be adjusted with respect to a voltage on primary side 720a of transformer 720. A load 710 is in electrical communication with a secondary side of a transformer 720. Voltage and current measurements may be obtained by an IED 740. In one embodiment IED 740 may be embodied as a transformer protection relay, such as model no. SEL-487E, available from Schweitzer Engineering Laboratories, Inc., of Pullman, Wash. IED 740 may be configured to provide measurements according to various protocols, such as IEEE C37.118, to a load modeling system 750.

Figure 7B:
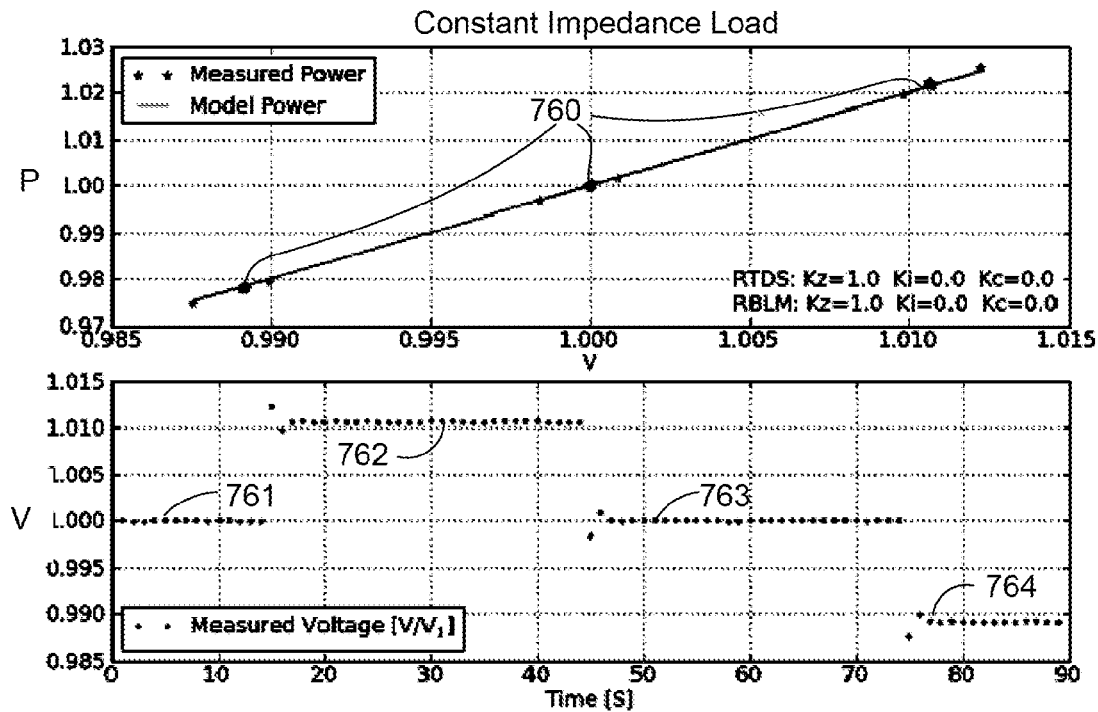
FIG. 7B illustrates voltage and active power measurements taken in a system configured as shown in FIG. 7A, together with predictions of a load model simulating a constant impedance load.

As will be described in connection with FIGS. 7B-7E, various load model parameters may be utilized to model load 710. FIG. 7B illustrates the response of system 700, where load 710 is a constant impedance load. As illustrated in FIG. 7B, the input voltage is 1 P.U. during a first period 761, is 1.01 P.U. during a second period 762, is 1 P.U. during a third period 763, and is 0.99 P.U. during a fourth period 764. The changes in voltage may be caused by "tapping" transformer 720 either up or down.

In analyzing the data shown in FIG. 7B, a relay-based load modeling algorithm may determine that load 710 is a constant impedance load. This conclusion may be reached by determining that the variation between data points 760 is proportional to the square of the input voltage. Due to the size of the voltage changes involved in this scenario, the voltage-power curve shown in FIG. 7B does not show a parabolic shape; however, analysis of the data points may confirm the mathematical relationship between the measured voltage and the measured power.

Figure 7C:
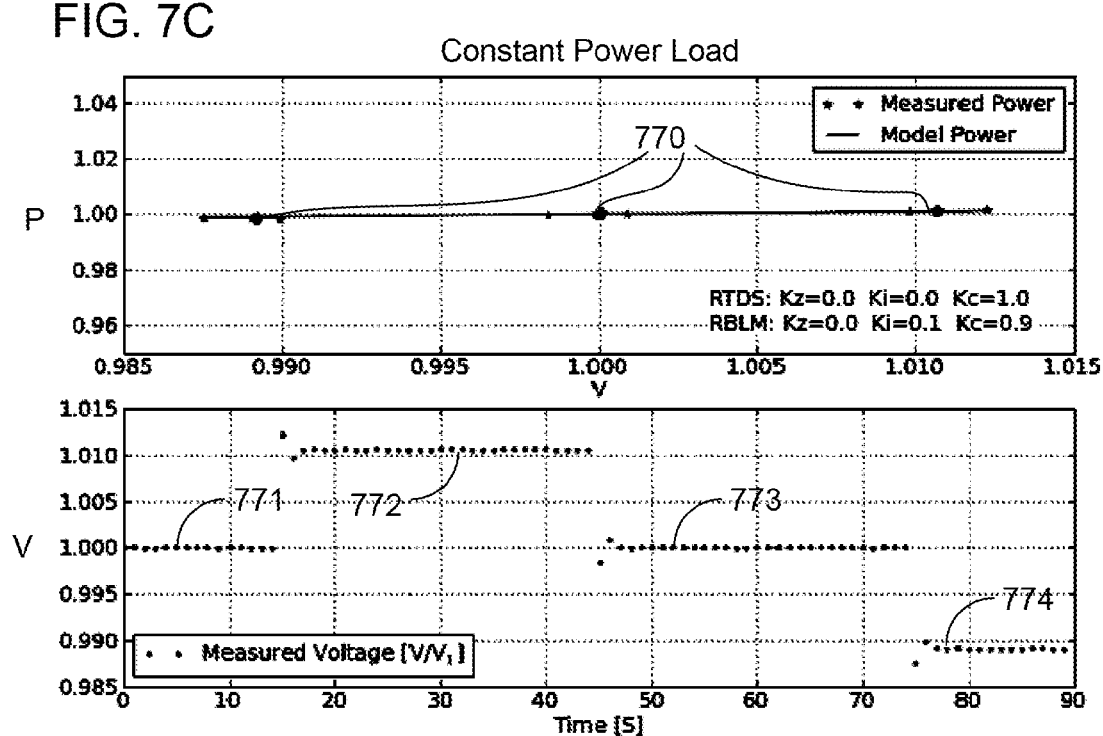
FIG. 7C illustrates voltage and active power measurements taken in a system configured as shown in FIG. 7A, together with predictions of a load model simulating a constant power load.

FIG. 7C illustrates the response of system 700 where load 710 is a constant power load. As illustrated in FIG. 7C, the input voltage is 1 P.U. during a first period 771, is 1.01 P.U. during a second period 772, is 1 P.U. during a third period 773, and is 0.99 P.U. during a fourth period 774. In response to the changes in the voltage input, the data points 770 remain constant. Accordingly, a relay-based load modeling algorithm may determine, by analyzing the data shown in FIG. 7C, that load 710 corresponds to a constant power load in this scenario. This conclusion may be reached by determining that power consumption remains constant regardless of changes in the input voltage.

Figure 7D:
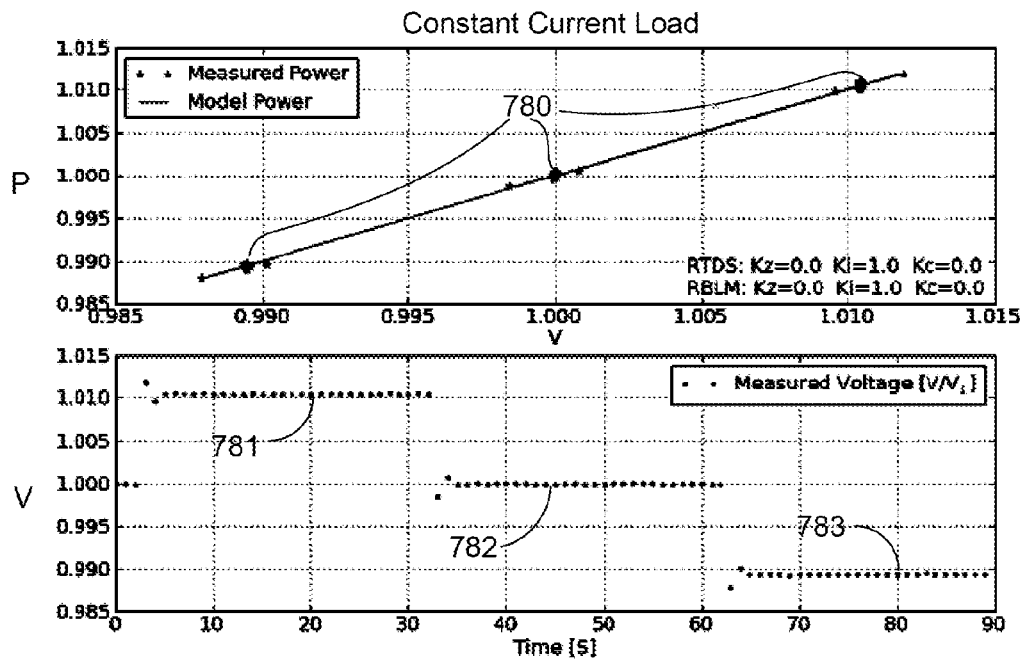
FIG. 7D illustrates voltage and active power measurements taken in a system configured as shown in FIG. 7A, together with predictions of a load model simulating a constant current load.

FIG. 7D illustrates the response of system 700 where load 710 is a constant current load. As illustrated in FIG. 7D, the input voltage is 1.01 P.U. during a first period 781, is 1.00 P.U. during a second period 782, and is 0.99 P.U. during a third period 783. The data points 780 show an increase in power associated with a decrease in voltage. Accordingly, a relay-based load modeling algorithm may determine by analyzing the data shown in FIG. 7D that load 710 corresponds to a constant power load in this scenario. This conclusion may be reached by determining that a decrease in voltage results in an increase in power.

Figure 7E:
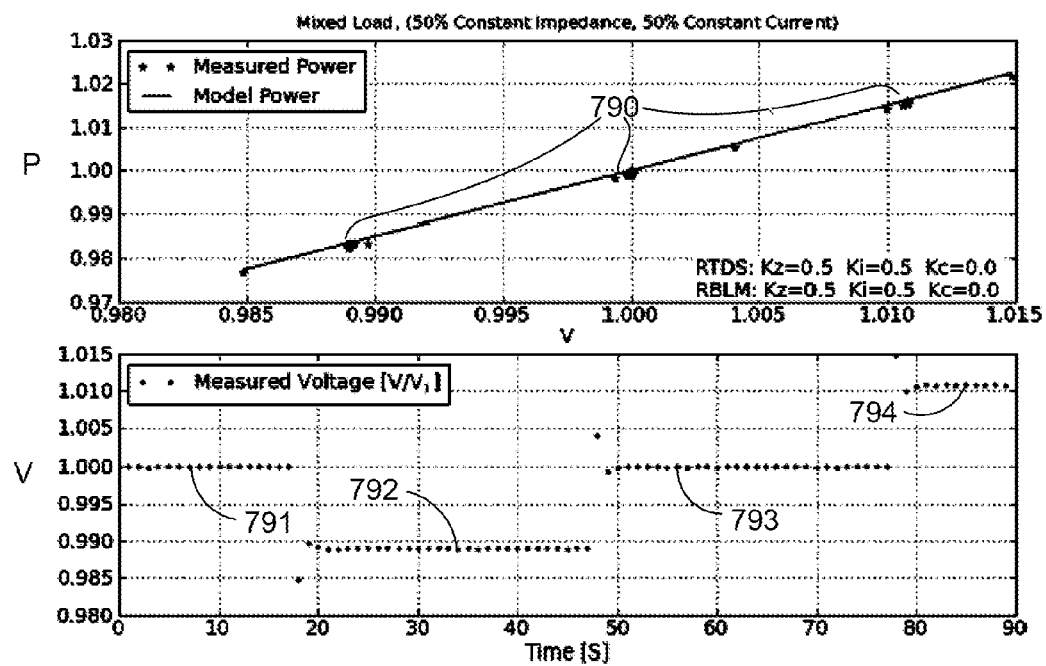
FIG. 7E illustrates voltage and active power measurements taken in a system configured as shown in FIG. 7A, together with predictions of a load model simulating a 50% constant impedance load and a 50% constant current load.

Finally, FIG. 7E illustrates the response of system 700 where load 710 is a 50% constant impedance load and a 50% constant current load. As illustrated in FIG. 7E, the input voltage is 1 P.U. during a first period 791, is 0.99 P.U. during a second period 792, is 1 P.U. during a third period 793, and is 1.01 P.U. during a fourth period 794. The response indicated by data points 790 would not correspond to either a load having a constant impedance or to a load having a constant current; accordingly, a relay based load modeling system may arrive at a weighted average of differing types of loads using an algorithm to minimize any error between data points 790 and power predicted by a load model.

A relay based load modeling system may include a variety of user selectable settings and calibration settings. In addition, certain relay bits may also be utilized in connection with the relay load modeling system. Table 1 contains a list of user selectable settings, according to one embodiment. In other embodiments, more, fewer, or different user settings may be employed. Also, in various embodiments, default values may be employed that differ from those shown in Table 1.

TABLE 1

| Name | Description | Range | Default Value |
|---|---|---|---|
| LMTRG | Load Modeling Trigger (logic equation) | SV | LMDTC and not TR |
| LMWL | Window Length (10, 60, 600 Seconds) | 10, 60, 600 | 60 |
| LMNOS | Number of Samples in Data Window (50, 100, 200) | 50, 100, 200 | 100 |
| LMVTRE | Min. V. Excursion Asserting LMDTC (0.01-1 p.u.) | 0.01, 0.02, ... 1.00 | 0.1 |
| LMPVA1 | Va1 for Active Power Load Model (0-1) | 0.00, 0.01, ... 1.00 | 0.6 |
| LMPVB1 | Vb1 for Active Power Load Model (0-LMPVA1) | 0.00, 0.01, ... LMPVA1 | 0 |
| LMPVA2 | Va2 for Active Power Load Model (0-1) | 0.00, 0.01, ... 1.00 | 0.5 |
| LMPVB2 | Vb2 for Active Power Load Model (0-LMPVA2) | 0.00, 0.01, ... LMPVA2 | 0 |
| LMQVA1 | Va1 for Reactive Power Load Model (0-1) | 0.00, 0.01, ... 1.00 | 0.6 |
| LMQVB1 | Vb1 for Reactive Power Load Model (0-LMQVA1) | 0.00, 0.01, ... LMQVA1 | 0 |
| LMQVA2 | Va2 for Reactive Power Load Model (0-1) | 0.00, 0.01, ... 1.00 | 0.5 |
| LMQVB2 | Vb2 for Reactive Power Load Model (0-LMQVA2) | 0.00, 0.01, ... LMQVA2 | 0 |

Table 2 contains a list of calibration level settings, according to one embodiment.

TABLE 2

| Name | Description | Range | Default Value |
|---|---|---|---|
| LMSNRTHR | SNR Save Threshold | 0.00, 0.01, ... 100 | 10 |
| LMTSTEP | Parameter Tuning Step | 0.01, 0.02, ... 0.20 | |

Table 3 lists a bit that may be asserted upon the detection of a load modeling event.

TABLE 3

| Name | Description | Type |
|---|---|---|
| LMDTC | Voltage event detection | Voltage event detection |

Figure 8:
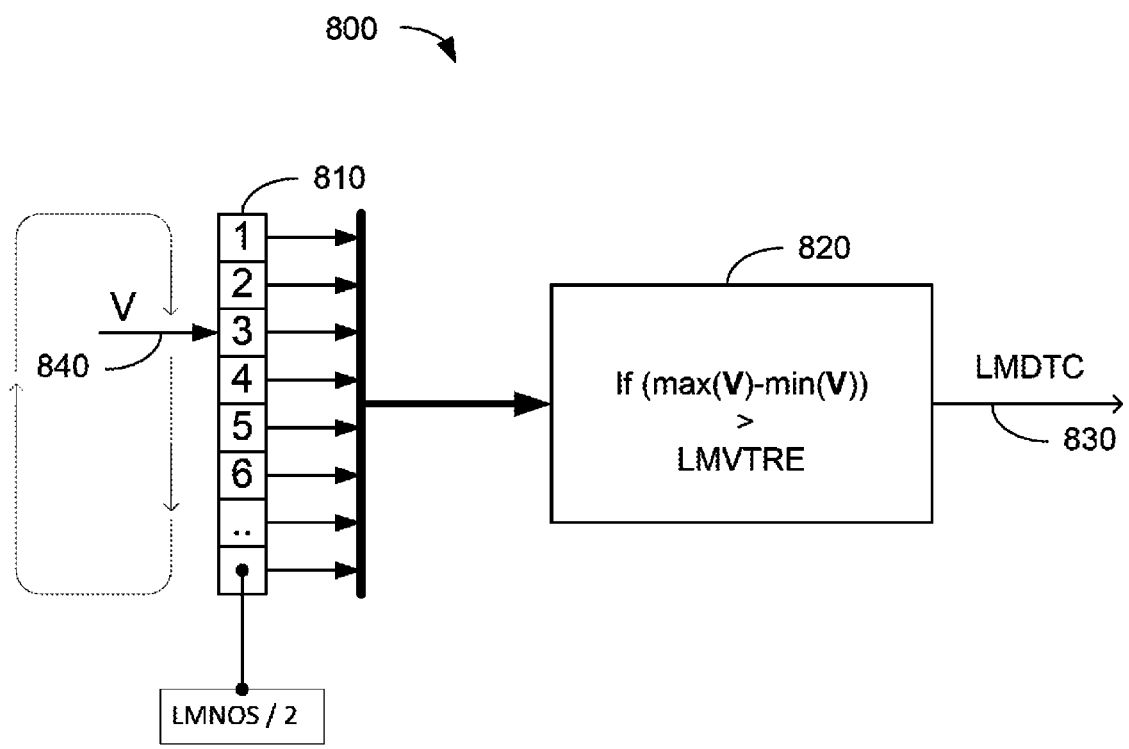
FIG. 8 illustrates one embodiment of a load modeling event detector.

As discussed above, a load modeling system may utilize data collected before and/or after a load modeling event. Certain criteria may be established for detecting a load modeling event. FIG. 8 illustrates one embodiment of a load modeling event detector 800. In the illustrated embodiment, load modeling event detector 800 receives a sequence of voltage measurements every processing cycle via an input 840. The voltage measurements are sequentially placed in a buffer 810. In the illustrated embodiment, buffer 810 may be a circular buffer of a length equal to half the number of samples in a data window (LMNOS/2). Detection module 820 may determine when the difference between the maximum voltage value stored in buffer 810 and the minimum voltage value stored in the buffer 810 is greater than a threshold value, LMVTRE. As indicated in table 1, above, LMVTRE may be a user selectable value. Upon the detection of criteria satisfying the requirements of detection module 820, an LMDTC signal 830 may be asserted. In certain embodiments, detection module 820 may also identify a signal to noise ratio associated with any assertion of the LMDTC signal 830.

Table 4 illustrates various periods and frequencies for systems having three different values of LMWL and LMNOS.

TABLE 4

| | LMWL := 10[s] | | LMWL := 60[s] | | LMWL := 600[s] | |
|---|---|---|---|---|---|---|
| LMNOS | Period | Frequency | Period | Frequency | Period | Frequency |
| 50 | 0.2[s] | 5[Hz] | 1.2[s] | 0.8333[Hz] | 12[s] | 0.0833[Hz] |
| 100 | 0.1[s] | 10[Hz] | 0.6[s] | 1.6666[Hz] | 6[s] | 0.1666[Hz] |
| 200 | 0.05[s] | 20[Hz] | 0.3[s] | 3.3333[Hz] | 3[s] | 0.3333[Hz] |

Figure 9:
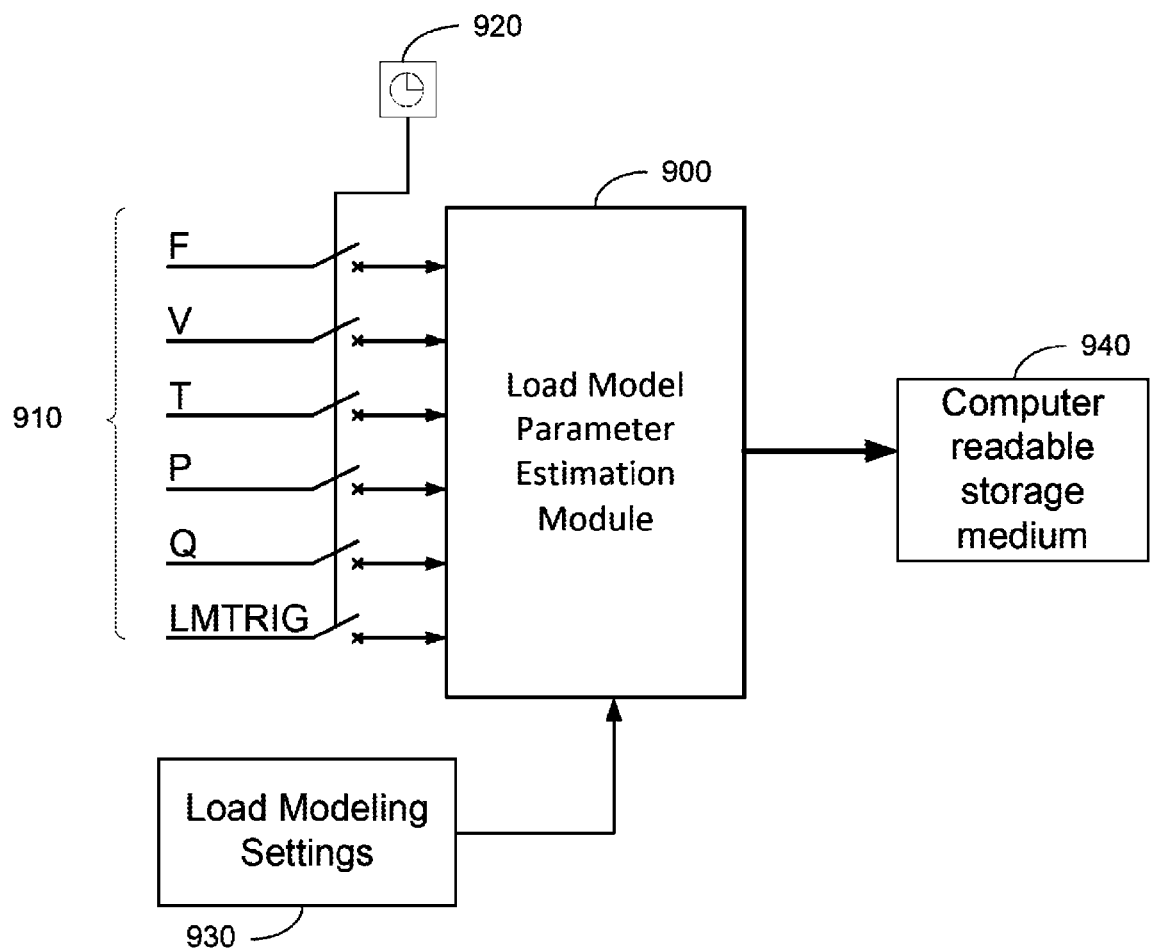
FIG. 9 illustrates a block diagram of one embodiment of a load model parameter estimation module.

As described above, a load model may include parameters that are tuned so that the load model matches the characteristics of a particular physical load. In various embodiments, a load model parameter estimation module may analyze data associated with a load modeling event and generate appropriate load model parameters. FIG. 9 illustrates a block diagram of one embodiment of a load model parameter estimation module 900. A plurality of inputs 910 may be provided to load model parameter estimation module 900. In the illustrated embodiment, inputs 910 include frequency, voltage, time, real power, reactive power, and LMTRG. A clock 920 may control a plurality of switches that selectively connect the inputs 910 to the load model parameter estimation module 900. In one embodiment, clock 920 has a period equal to LMWL divided by LMNOS. Load model parameter estimation module 900 may also receive load modeling settings 930. The load model parameters determined by load model parameter estimation module 900 may be written to a computer readable storage medium 940.

Figure 10B:
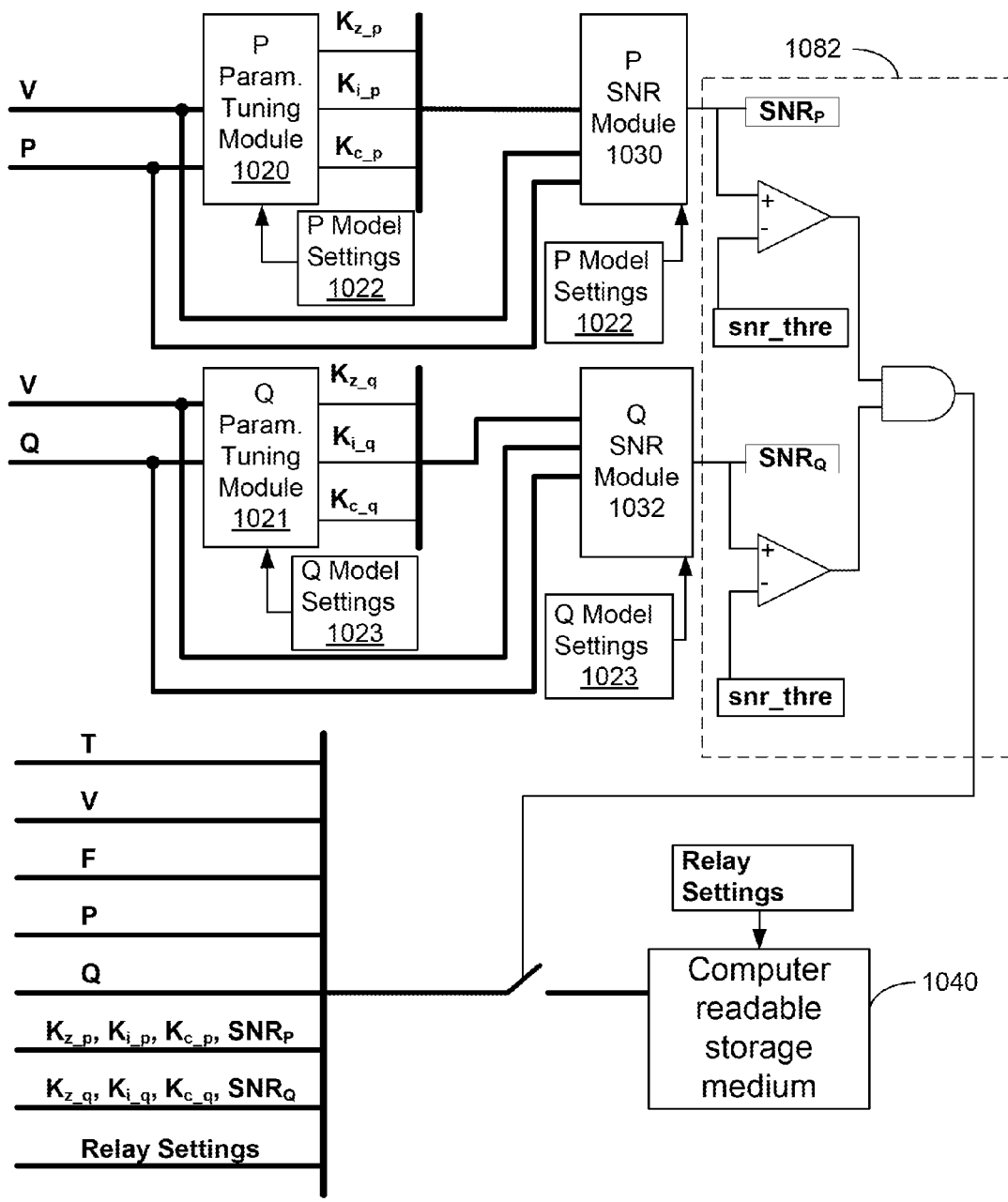

FIGS. 10A and 10B illustrate the internal components of load model parameter estimation module 900, according to one embodiment. FIG. 10A illustrates a plurality of buffers 1010a-e to store input data. FIG. 10A also illustrates trigger logic 1080 that may control switches for selectively transmitting certain values of the inputs to the system shown in FIG. 10B. When LMTRG is asserted, the output of AND gate 1081 will be asserted, which will case cause rising edge trigger 1082 to be asserted and to remain asserted by timer 1083 for $d_o$ cycles, where $d_o$ is equal to half of LMNOS. Falling edge trigger 1084 then is not asserted, and accordingly the output of and gate 1085 is not asserted until LMTRG is again asserted. Upon initialization, the Init variable is TRUE. Immediately after the buffers are filed, Init becomes False. In various embodiments, trigger circuitry 1080 may be implemented in various ways. The illustrated embodiment is provided as only one example of a trigger circuit that may be used.

FIG. 10B illustrates a block diagram of a system for calculating tuning parameters. The buffered data inputs V and P are provided to a P parameter tuning module 1020. P model settings 1022 are also provided to P parameter tuning module 1020. Based on the buffered data inputs V and P, and P model settings 1022 (LMPVA1, LMPVB1, LMPVA2, LMPVB2), P parameter tuning module 1020 generates the active power parameters, $K_{z\_p}$, $k_{i\_p}$, and $K_{c\_p}$. The active power parameters, $K_{z\_p}$, $K_{i\_p}$, and $K_{c\_p}$, the P model settings 1022, and buffered data inputs V and P are provided to P SNR module 1030. P SNR module 1030 generates a value of the signal to noise ratio of these values, $SNR_p$.

Buffered data inputs V and Q are provided to a Q parameter tuning module 1021, together with Q model settings 1023 (LMPVA1, LMPVB1, LMPVA2, LMPVB2). Based on buffered data inputs V and Q, and Q model settings 1023, Q parameter tuning module 1021 generates the reactive power parameters, $K_{z\_q}$, $K_{i\_q}$, and $K_{c\_q}$. The reactive power parameters, $K_{z\_q}$, $K_{i\_q}$, and $K_{c\_q}$, the Q Model settings 1023, and the buffered data inputs V and Q are provided to Q SNR module 1032. P SNR module 1032 generates a value of the signal to noise ratio of these values, $SNR_Q$.

Write trigger logic 1082 controls the conditions under which data is written to a computer readable storage medium 1040. In the illustrated embodiment, write trigger logic 1082 determines whether $SNR_p$ and $SRN_q$ are each greater than a specified threshold signal to noise ratio, srn_thre. If $SNR_p$ and $SRN_q$ are each greater than srnthre, the data is written to the computer readable storage medium 1040.

P parameter tuning module 1020 and Q parameter tuning module 1021 each receive as inputs two arrays (V and P in the case of module 1020 and V and Q in the case of module 1021) and model settings (P model settings in the case of module 1020 and Q model settings in the case of module 1021). The arrays of V, P, and Q, are of a length equal to the variable LMNOS.

Eq. 15 illustrates a static load model that may be utilized in modules 1020 and 1021 to generate load model parameters based on measurements of a physical load.

Eq. 15 is one specific implementation of Eq. 2, that satisfies all of the indicated conditions in Eq. 11.

$$P(V, K_z, K_i, V_{a1}, V_{b1}, V_{b2}, V_1, P_1) = \begin{cases} P_1\left(K_z\left(\frac{V}{V_1}\right)^2 + K_c\Phi(V, V_{a1}, V_{b1}) + K_i\frac{V}{V_1}\Phi(V, V_{a2}, V_{b2})\right), & \text{if } V_1 > 0 \\ P_1, & \text{Otherwise,} \end{cases} \quad \text{(Eq. 15)}$$

Eq. 15 is also subject to the conditions set forth in Eq. 16.

$$0 \leq V_{a1} \leq 1$$

$$0 \leq V_{b1} \leq V_{a1}$$

$$0 \leq V_{a2} \leq 1$$

$$0 \leq V_{b2} \leq V_{a2}$$

$$K_z, K_i, K_c \in \mathbb{R}^+$$

$$K_z + K_i + K_c = 1 \quad \text{(Eq. 16)}$$

In Eq. 15, $P_1$, is the initial real power and $V_1$ is the voltage associated with $P_1$. In Eq. 15, V is the independent variable and Kz, Kc, and Ki are the model parameters. The function $\Phi(V, V_a, V_b)$ is as defined in Eq. 3, above.

Modules 1020 and 1021 obtain $K_z$, $K_i$, and $K_c$, for both P and Q parameters, by minimizing $\epsilon$ in Eq. 17.

$$\varepsilon(K_z, K_i, K_c, V_{a1}, V_{b1}, V_{a2}, V_{b2}, V, P) = \qquad \text{(Eq. 17)}$$

$$\sum_{j=1}^{n}(P(V_j, K_z, K_i, K_c, V_{a1}, V_{b1}, V_{a2}, V_{b2}, V_1, P_1) - P_j)^2$$

To minimize $\varepsilon$, and obtain $K_z$, $K_i$, and $K_c$, modules 1020 and 1021 may use a variety of error minimization algorithms. One such error minimization algorithm is set forth below and may be utilized in connection with Eq. 17.

```
Inputs: V_a1, V_b1, V_a2, V_b2 V, P,
Outputs: K_z min, K_i min, K_c min
K_c min = 0
K_z min = 1
K_i min = 0
ε_min = ε(K_z min, K_i min, K_c min V_a1, V_b1, V_a2, V_b2, V, P)
FOR Kc = 0 TO kc = 1.0 STEP = LMTSTEP
    FOR Ki = 0 TO ki = (1.0 − Kc) STEP = LMTSTEP
        Kz = (1.0 − Kc − Ki)
        ε_now = ε(Kz, Ki, Kc, V_a1, V_b1, V_a2, V_b2, V, P)
        IF ε_now < ε_min THEN
            ε_min = ε_now
            K_c min = Kc
            K_z min = Kz
            K_i min = Ki
        END_IF
    END_FOR
END_FOR
```

P SNR module 1030 and Q SRN module 1032 each receive as inputs two arrays (V and P in the case of module 1030 and V and Q in the case of module 1032), model settings (P model settings in the case of module 1030 and Q model settings in the case of module 1032), and parameters $K_z$, $K_i$, and $K_c$ ($K_{z\_p}$, $K_{i\_p}$, $K_{c\_p}$ in the case of module 1030 and $K_{z\_q}$, $K_{i\_q}$, $K_{c\_q}$ in the case module 1032). Again, the arrays of V, P, and Q, are of a length (n)) equal to the variable LMNOS. With these data, SNR modules 1030 and 1032 may compute the SNR using Eq. 18.

$$SNR_{db} = 10\log_{10}\left(\frac{\sum_{j=1}^{n}P_j^2}{\sum_{j=1}^{n}(P(V_j, K_z, K_i, K_c, V_{a1}, V_{b1}, V_{a2}, V_{b2}, V_1, P_1) - P_j)^2}\right) \qquad \text{(Eq. 18)}$$

In Eq. 18, $P(V, K_z, K_i, K_c, V_{a1}, V_{b1}, V_{a2}, V_{b2}, V_1, P_1)$ is defined by Eq. 15. The input argument power (P=[$P_1, P_2, \ldots P_{n-1}, P_n$])) may contain active power or reactive power values, as appropriate for vmodules 1020 and 1021, respectively. In certain embodiments, a low SNR for an event may provide an indication that the results of a load model or the data associated with a particular load modeling event should be adjusted or discarded.

A variety of reports may be generated by a load modeling system. In a system in which a plurality of relays each develop load models and communicate information regarding each relay's load model, a compact report form may be utilized to allow for an efficient exchange of load model information.

FIG. 11 illustrates one embodiment of a report 1100 (LMHISTORY), that may be utilized in connection with a relay based load modeling system. Report 1100 includes a header comprising lines 1101 and 1102. The header may include a date and time that a report is generated and information regarding the device (e.g., a serial number, a device identifier, a location identifier, etc.) providing information contained in the report. Report 1100 contains three separate load modeling events. The first event comprises lines 1103 through 1107, the second event comprises lines 1108 through 1112, and the third event comprises lines 1113 through 1117. Report 1100 may be described as a load dynamics report because it contains information describing load model parameters that may be utilized to describe a physical load; however, the term load dynamics report is not limited to the format or content of report 1100.

The first row of each LMHISTORY event (e.g., rows 1101, 1108, and 1113) contains the event number, date, time. The event number may be an event identifier between 10000 and 42767 that can be used to view information on a particular event. The event identifier may be a unique number that is always attached to one load modeling event. A sequential event identifier may be generated for each new event. Once 42767 events have been logged, the event number may wrap around to 10000.

The second row of each LMHISTORY event (e.g., rows 1104, 1109, and 1114) contains information regarding the maximum and minimum voltages of the particular load modeling event. As discussed in connection with FIG. 8, the difference between the maximum voltage and the minimum voltage must be greater than a threshold value in order to constitute a valid modeling event. Events having a larger voltage difference may provide more reliable information upon which to generate load model parameters. Accordingly, in the illustrated embodiment of report 1100, the values of the maximum voltage and the minimum voltage are reported and may be analyzed to determine the magnitude of a particular load modeling event.

The third row of each LMHISTORY event (e.g., rows 1105, 1110, and 1115) contains headers (e.g., $K_z$, $K_i$, $K_c$, $V_{a1}$, $V_{b1}$, $V_{a1}$, $V_{b2}$, and the SNR) for the active an reactive power models parameters shown in rows four and five. The fourth row of each LMHISTORY event (e.g., rows 1106, 1111, and 1116) contains the parameters associated with the active power load model. The fifth row of each LMHISTORY event (e.g., rows 1107, 1112, and 1117) contains the parameters associated with the reactive power load model. As one of skill in the art will recognize, a function, which may also receive various arguments (e.g., a date filters, a query for a specific number of events, etc.), may be utilized to generate report 1100.

Figure 12:
FIG. 12 illustrates one embodiment of a report containing information regarding a load modeling event.

FIG. 12 illustrates one embodiment of a report 1200 (LMEVE), which includes measurement data regarding each modeling event. Report 1200 includes a header comprising lines 1201 and 1202. As described in connection with FIG. 11, the header may include a date and time that a report is generated and information regarding the device (e.g., a serial number, a device identifier, a location identifier, etc.) providing information contained in the report. The report 1200 may also include LMHISTORY event data, similar to the data presented in report 1100, shown in FIG. 11. Report 1200 may provide information suitable to include in a power flow analysis or other analysis of an electric power distribution system.

FIG. 13 illustrates one embodiment of a report 1300 configured to provide information regarding electrical conditions in an electric power distribution system prior to and following a load modeling event. Information regarding two load modeling events 1320 and 1321 is shown in report 1300. Column 1301 includes the date of the load modeling event. In alternative embodiments, the time of each load modeling event may also be shown. Information regarding the pre-event conditions (e.g., V, P, and Q) is shown in columns 1302, 1303, and 1304, and information regarding the post-event conditions (e.g., V, P, and Q) is shown in columns 1305, 1306, and 1307. Report 1300 may describe the specific type of event that caused the load modeling event in column 1308. Finally, columns 1309 and 1310 include a measurement of the change in active power with respect to the change in voltage, and a measurement of the change in reactive power with respect to the change in voltage, respectively.

Many changes may be made to the details of the above-described embodiments without departing from the underlying principles of the present disclosure. The scope of the present invention should, therefore, be determined only by the following claims.

The invention claimed is:

1. An electric power distribution system to distribute power to at least one load, comprising:
   a first load;
   a bus connected to the first load;
   a capacitor bank in electrical communication with the bus;
   a first intelligent electronic device (IED) configured to interface with the electric power distribution system, comprising:
      a first network communications interface;
      a processor; and
      a computer-readable storage medium, comprising:
         software instructions executable on the processor that enable the IED to perform operations, including:
            determining that the capacitor bank has been connected to the bus;
            receiving a first plurality of measurements representing an electrical condition in at least a portion of the electric power distribution system prior to connecting the capacitor bank to the bus and subsequent to connecting the capacitor bank to the bus; and,
            calculating a load model based on the first plurality of measurements, the load model representing a predicted response of the first load to a variation in at least one electrical characteristic of power distributed by the electric power distribution system.

2. The electric power distribution system of claim 1, wherein the software instructions executable on the processor enable the IED to perform operations, including:
   identifying that the first load comprises a constant impedance load; and
   determining that the electrical condition comprises the electric power distribution system exceeding a ratio of power consumption to power generation; and
   reducing the voltage provided to the first load.

3. The electric power distribution system of claim 1, wherein the software instructions executable on the processor enable the first IED to perform operations, including:
   identifying that the first load comprises a constant power load;
   determining that the electrical condition comprises the electric power distribution system exceeding a ratio of power consumption to power generation; and
   electrically disconnecting the first load from the electric power distribution system.

4. The electric power distribution system of claim 1, wherein the software instructions executable on the first processor further enable the IED to perform operations, including:
   adjusting the load model based upon at least one of a season, a day of the week, and a time of the day in which the electrical condition occurs.

5. The electric power distribution system of claim 1, further comprising:
   a second IED configured to interface with the electric power distribution system, comprising:
      a second network communications interface to communicate with the first IED;
      a sensor component configured to make measurements on the bus;
      a second processor; and
      a second computer-readable storage medium, comprising:
         software instructions executable on the second processor that enable the second IED to perform operations, including:
            identifying an event based on measurements made by the sensor component;
            recording a second plurality of measurements representing electrical conditions in at least a portion of the electric power distribution system prior to the event and subsequent to the event;
            generating a load dynamics report comprising the second plurality of measurements; and
            transmitting the load dynamics report to the first IED.

6. The electric power distribution system of claim 5, wherein the software instructions executable on the first processor further enable the first IED to perform operations, including:
   receiving the load dynamics report;
   identifying the second event as a second modeling event;
   calculating a second load model based on the second plurality of measurements, the second load model representing a predicted response of the first load to a variation in at least one electrical characteristic of power distributed by the electric power distribution system; and
   determining an optimized control strategy based on the first calculated load model and the second calculated load model.

7. The electric power distribution system of claim 5, wherein each of the first IED and the second IED further comprise an external time input configured to receive an external time signal from an external time source; and
   wherein the software instructions executable on each of the first processor and the second processor further enable the first IED and the second IED to perform operations, including:
      recording a time based on the external time source and associated with each of the first plurality of measurements and the second plurality of measurements.

8. The electric power distribution system of claim 1, wherein the first load model further represents sensitivity of the first load to variations in voltage of power distributed by the electric power distribution system.

9. An electric power distribution system to distribute power to at least one load, comprising:
   a first load;
   a first bus connected to the first load;
   a primary transformer in electrical communication with the first bus;

a first intelligent electronic device (IED) configured to interface with the electric power distribution system, comprising:
  a network communications interface;
  a processor; and
  a computer-readable storage medium, comprising:
    software instructions executable on the processor that enable the IED to perform operations, including:
      determining that an adjustment has been made to an output voltage of the primary transformer;
      receiving a first plurality of measurements representing an electrical condition in at least a portion of the electric power distribution system prior to the adjustment of the output voltage of the primary transformer and subsequent to the adjustment of the output voltage of the primary transformer; and,
      calculating a first load model based on the first plurality of measurements, the first load model representing a predicted response of the first load to a variation in at least one electrical characteristic of power distributed by the electric power distribution system.

10. The electric power distribution system of claim 9, further comprising:
  a second IED configured to interface with the electric power distribution system, comprising:
    a network communications interface to communicate with the first IED;
    a sensor component configured to make measurements on the bus;
    a second processor; and
    a second computer-readable storage medium, comprising:
      software instructions executable on the second processor that enable the second IED to perform operations, including:
        identifying an event based on measurements made by the sensor component;
        recording a second plurality of measurements representing electrical conditions in at least a portion of the electric power distribution system prior to the event and subsequent to the event;
        generating a load dynamics report comprising the second plurality of measurements; and
        transmitting the load dynamics report to the first IED.

11. The electric power distribution system of claim 10, wherein the software instructions executable on the first processor further enable the first IED to perform operations, including:
  receiving the load dynamics report;
  identifying the event as a modeling event;
  calculating a second load model based on the second plurality of measurements, the second load model representing a predicted response of the first load to a variation in at least one electrical characteristic of power distributed by the electric power distribution system; and
  determining an optimized control strategy based on the first calculated load model and the second calculated load model.

12. The electric power distribution system of claim 10, wherein each of the first IED and the second IED further comprise an external time input configured to receive an external time signal from an external time source; and
  wherein the software instructions executable on each of the first processor and the second processor further enable the first IED and the second IED to perform operations, including:
    recording a time based on the external time source and associated with each of the first plurality of measurements and the second plurality of measurements.

13. The electric power distribution system of claim 9, further comprising:
  a second bus; and
  a secondary transformer in electrical communication with the first bus and the second bus;
  wherein the software instructions executable on the first processor further enable the first IED to perform operations comprising:
    determining that the secondary transformer has been connected to the first bus and the second bus;
    receiving a second plurality of measurements representing an electrical condition in at least a portion of the electric power distribution system prior to the connection of the secondary transformer and subsequent to the connection of the secondary transformer; and,
    adjusting the load model based on the second plurality of measurements.

14. The electric power distribution system of claim 9, wherein the software instructions executable on the first processor enable the first IED to perform operations, comprising:
  identifying that the load comprises a constant impedance load; and
  determining that the electrical condition comprises the electric power distribution system exceeding a ratio of power consumption to power generation; and
  reducing the voltage provided to the load.

15. The electric power distribution system of claim 9, wherein the software instructions executable on the first processor enable the first IED to perform operations, comprising:
  identifying that the first load comprises a constant power load;
  determining that the electrical condition comprises the electric power distribution system exceeding a ratio of power consumption to power generation; and
  electrically disconnecting the first load from the electric power distribution system.

16. The electric power distribution system of claim 9, wherein the software instructions executable on the first processor further enable the first IED to perform operations comprising:
  adjusting the load model based upon at least one of a season, a day of the week, and a time of the day in which the electrical condition occurs.

17. The electric power distribution system of claim 9, further comprising:
  identifying that the first load comprises a constant impedance load;
  wherein the electrical condition comprises the electric power distribution system exceeding a ratio of power consumption to power generation; and
  determining a first optimized control strategy based on the first calculated load model;
  wherein the first optimized control strategy comprises reducing voltage provided to the first load.

18. The electric power distribution system of claim 9, further comprising:
  identifying that the first load comprises a constant power load;

wherein the electrical condition comprises the electric power distribution system exceeding a ratio of power consumption to power generation; and determining a first optimized control strategy based on the first calculated load model;

wherein the first optimized control strategy comprises electrically disconnecting the first load from the electric power distribution system.

19. The electric power distribution system of claim 9, wherein the software instructions executable on the first processor further enable the first IED to perform operations, including:

adjusting the first load model based upon at least one of a season, a day of the week, and a time of the day in which the electrical condition occurs.

20. An electric power distribution system to distribute power to at least one load, comprising:

a load;

a first bus connected to the load;

a second bus;

a primary transmission line in electrical communication with the first bus and the second bus;

a secondary transmission line; and an intelligent electronic device (IED) configured to interface with the electric power distribution system, comprising:

a network communications interface;

a processor; and a computer-readable storage medium, comprising:

software instructions executable on the processor that enable the IED to perform operations comprising:

determining that the secondary transmission line has been connected to the first bus and the second bus;

receiving a plurality of measurements representing an electrical condition in at least a portion of the electric power distribution system prior to the connection of the secondary transmission line to the first bus and the second bus and subsequent to the connection of the secondary transmission line to the first bus and the second bus; and, calculating a load model based on the plurality of measurements, the load model representing a predicted response of the load to a variation in at least one electrical characteristic of power distributed by the electric power distribution system.

21. An electric power distribution system to distribute power to at least one load, comprising:

a first load;

a second load;

a breaker for selectively connecting the second load to the electric power distribution system; and a first intelligent electronic device (IED) configured to interface with the electric power distribution system, comprising:

a first network communications interface;

a first processor; and a first computer-readable storage medium, comprising:

software instructions executable on the first processor that enable the first IED to perform operations, including:

determining that second load has been connected to the electric power distribution system;

receiving a first plurality of measurements representing an electrical condition in at least a portion of the electric power distribution system prior to the connection of the second load and subsequent to the connection of the second load; and, calculating a first load model based on the first plurality of measurements, the first load model representing a predicted response of the first load to a variation in at least one electrical characteristic of power distributed by the electric power distribution system.

22. A method of controlling an electric power distribution system, the method comprising:

identifying a plurality of modeling events;

collecting a plurality of measurements associated with each of the plurality of modeling events, each of the plurality of measurements representing electrical conditions in at least a portion of the electric power distribution system prior to each modeling event and subsequent to each modeling event;

calculating a load model based on the plurality of measurements and representing a predicted response of a plurality of loads to a variation in at least one electrical characteristic of power distributed by the electric power distribution system; and identifying that the plurality of loads comprises a specified ratio of constant impedance loads.

\* \* \* \* \*